(12) United States Patent
Bhardwaj et al.

(10) Patent No.: US 9,286,344 B1
(45) Date of Patent: Mar. 15, 2016

(54) METHOD AND SYSTEM FOR MAINTAINING CONSISTENCY FOR I/O OPERATIONS ON METADATA DISTRIBUTED AMONGST NODES IN A RING STRUCTURE

(71) Applicant: Nutanix, Inc., San Jose, CA (US)

(72) Inventors: Rishi Bhardwaj, San Jose, CA (US); Venkata Ranga Radhanikanth Guturi, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 244 days.

(21) Appl. No.: 14/144,520

(22) Filed: Dec. 30, 2013

Related U.S. Application Data

(60) Provisional application No. 61/786,478, filed on Mar. 15, 2013.

(51) Int. Cl.
*G06F 17/30* (2006.01)

(52) U.S. Cl.
CPC .... *G06F 17/30371* (2013.01); *G06F 17/30575* (2013.01)

(58) Field of Classification Search
CPC .......... G06F 17/00; G06F 17/30; G06F 11/00
USPC .................................................. 707/600–899
See application file for complete search history.

(56) References Cited

U.S. PATENT DOCUMENTS

2010/0262717 A1* 10/2010 Critchley ................ H04L 12/42
709/251

OTHER PUBLICATIONS

Lamport, Leslie, "*Paxos Made Simple*," dated Nov. 1, 2001 (14 pages).
Alexander Shraer, et al., "*Dynamic Reconfiguration of Primary/Backup Clusters*," dated 2011 (13 pages).

* cited by examiner

*Primary Examiner* — Isaac M Woo
(74) *Attorney, Agent, or Firm* — Vista IP Law Group, LLP

(57) ABSTRACT

A method for maintaining consistency for I/O operations on metadata distributed amongst a plurality of nodes forming a ring structure.

42 Claims, 40 Drawing Sheets

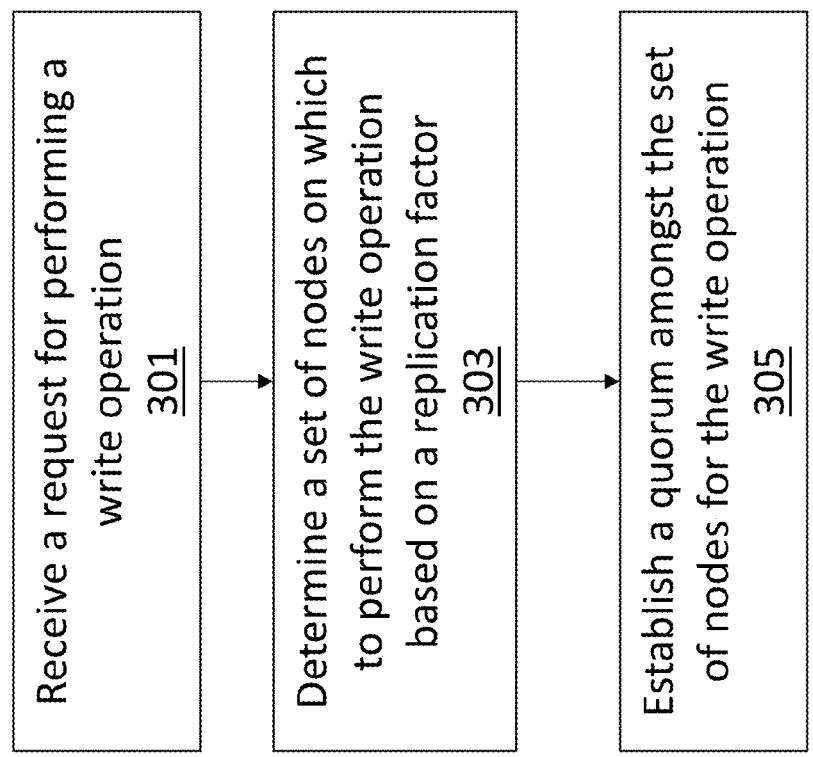

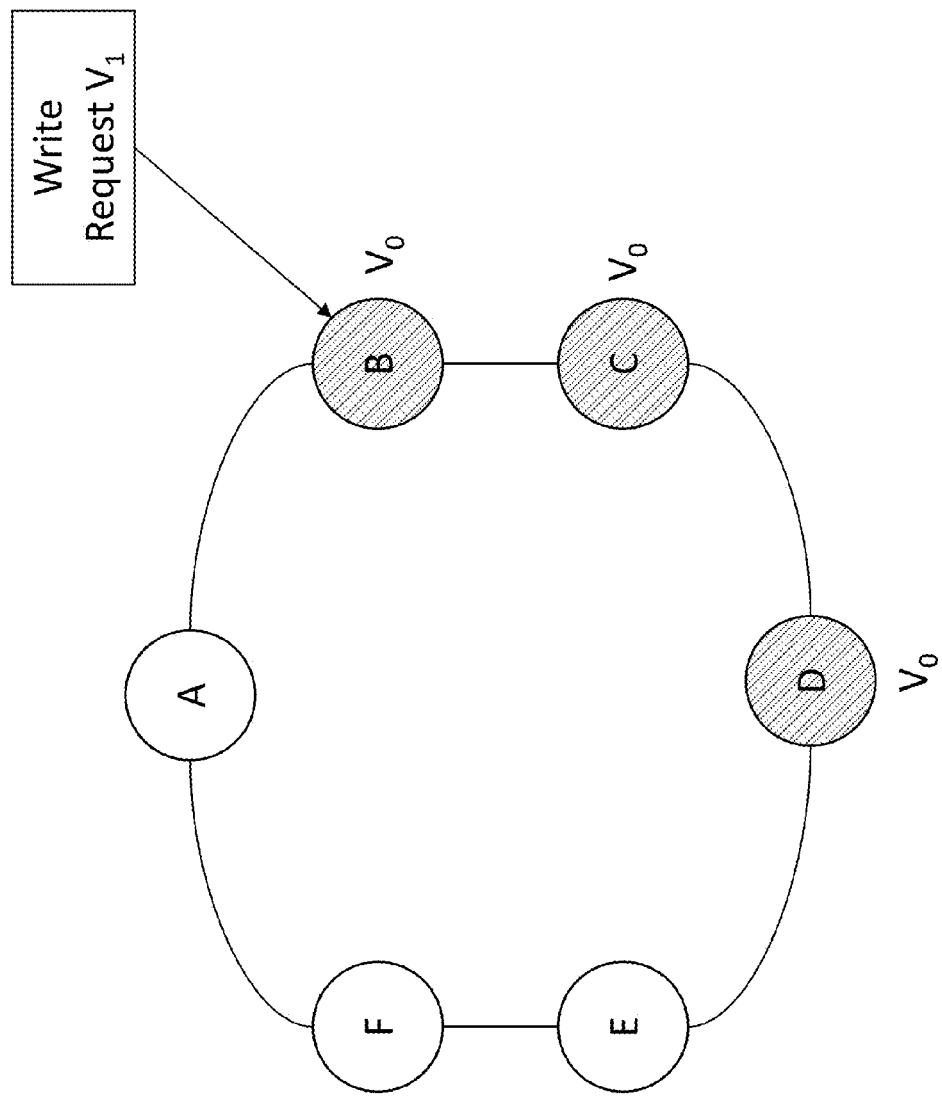

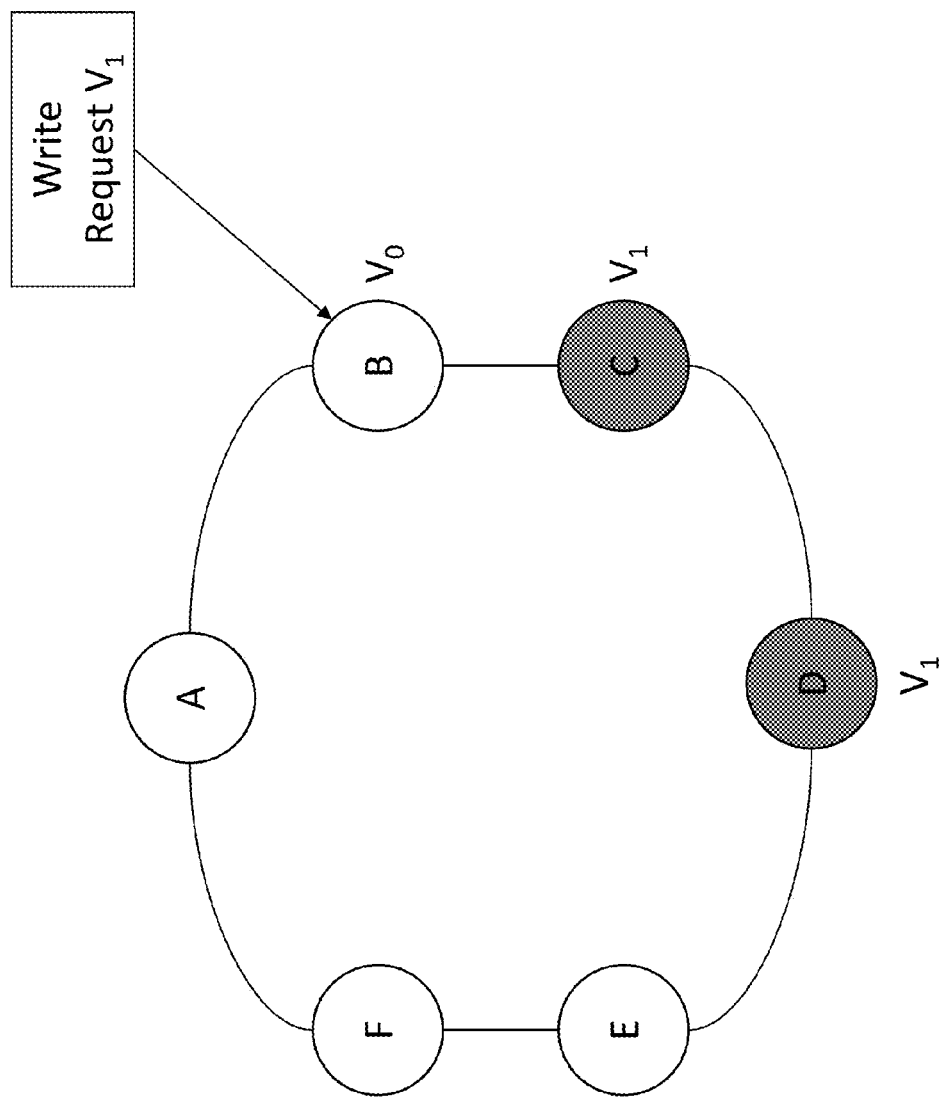

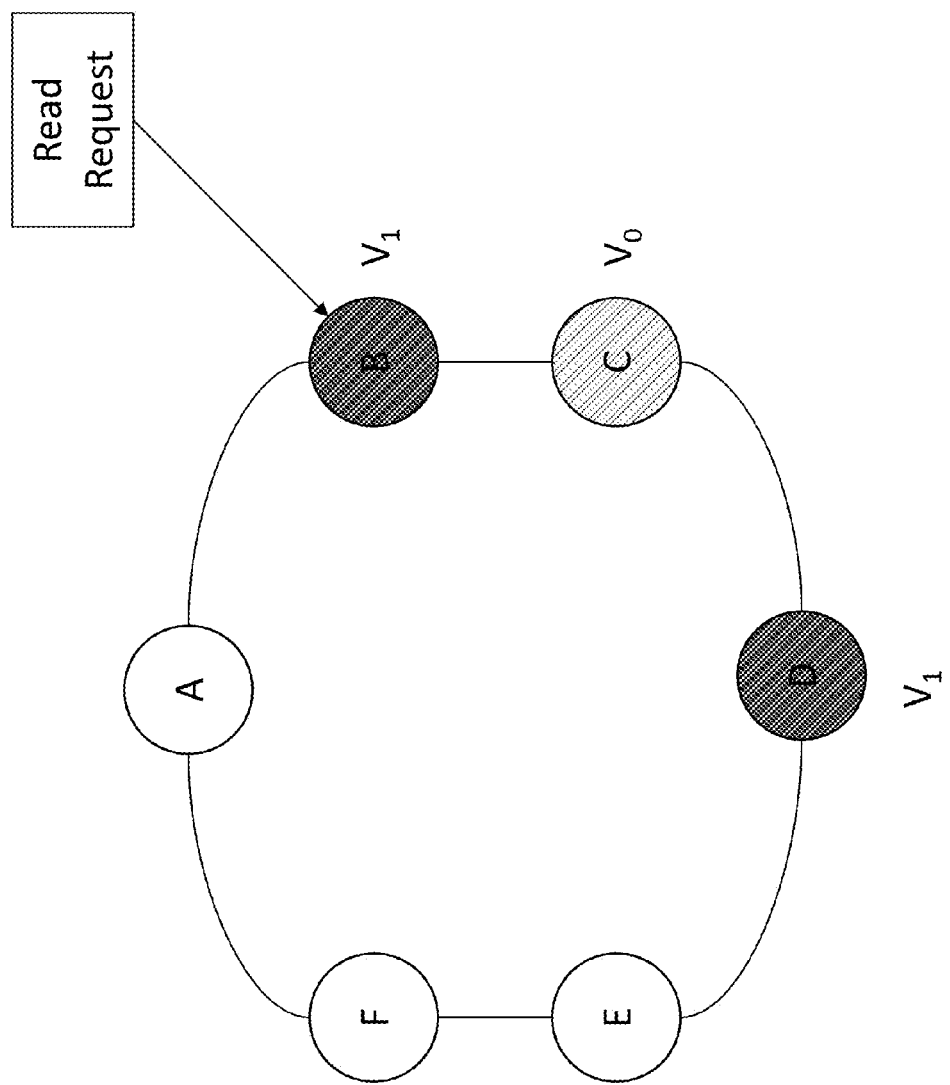

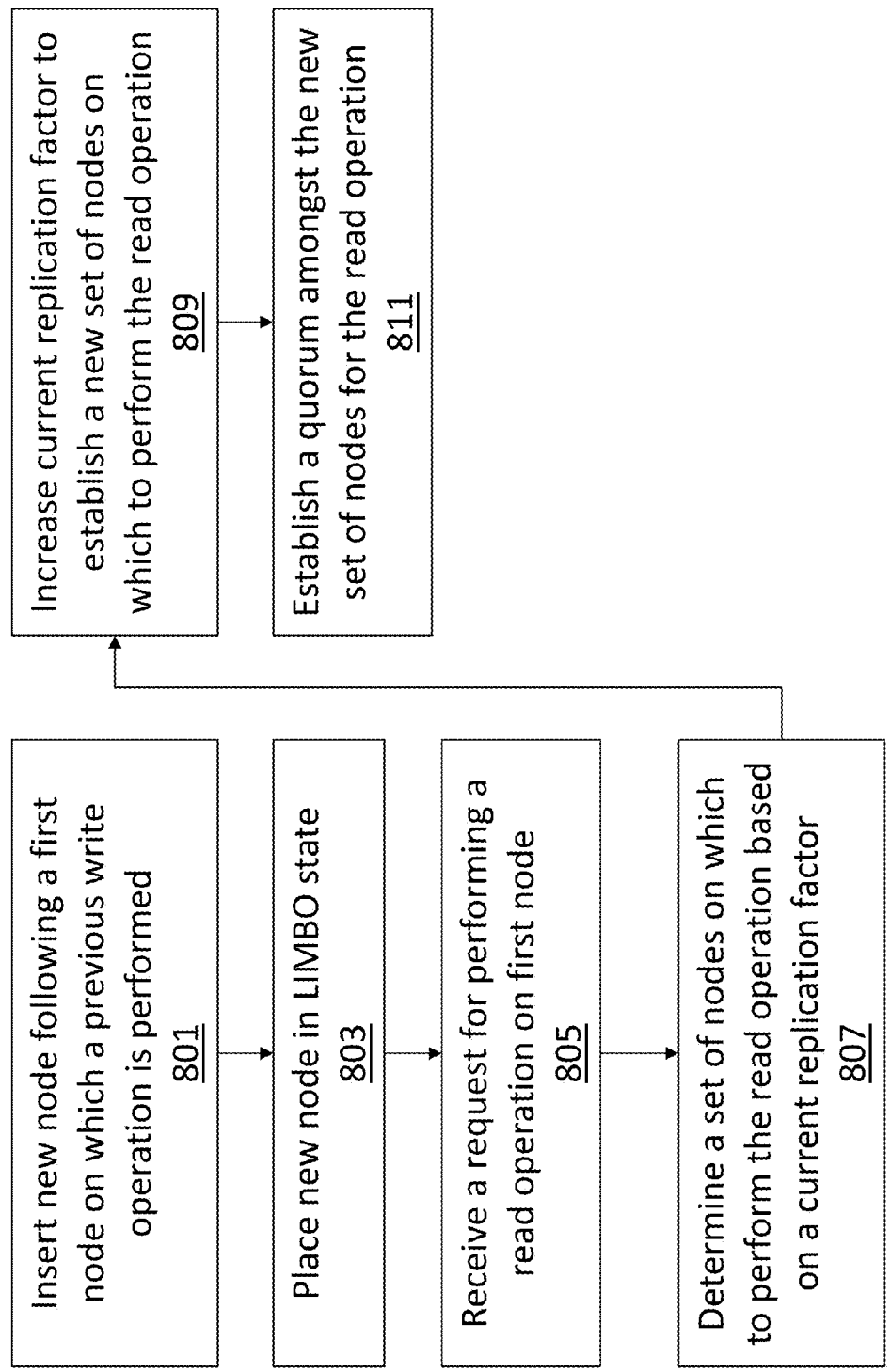

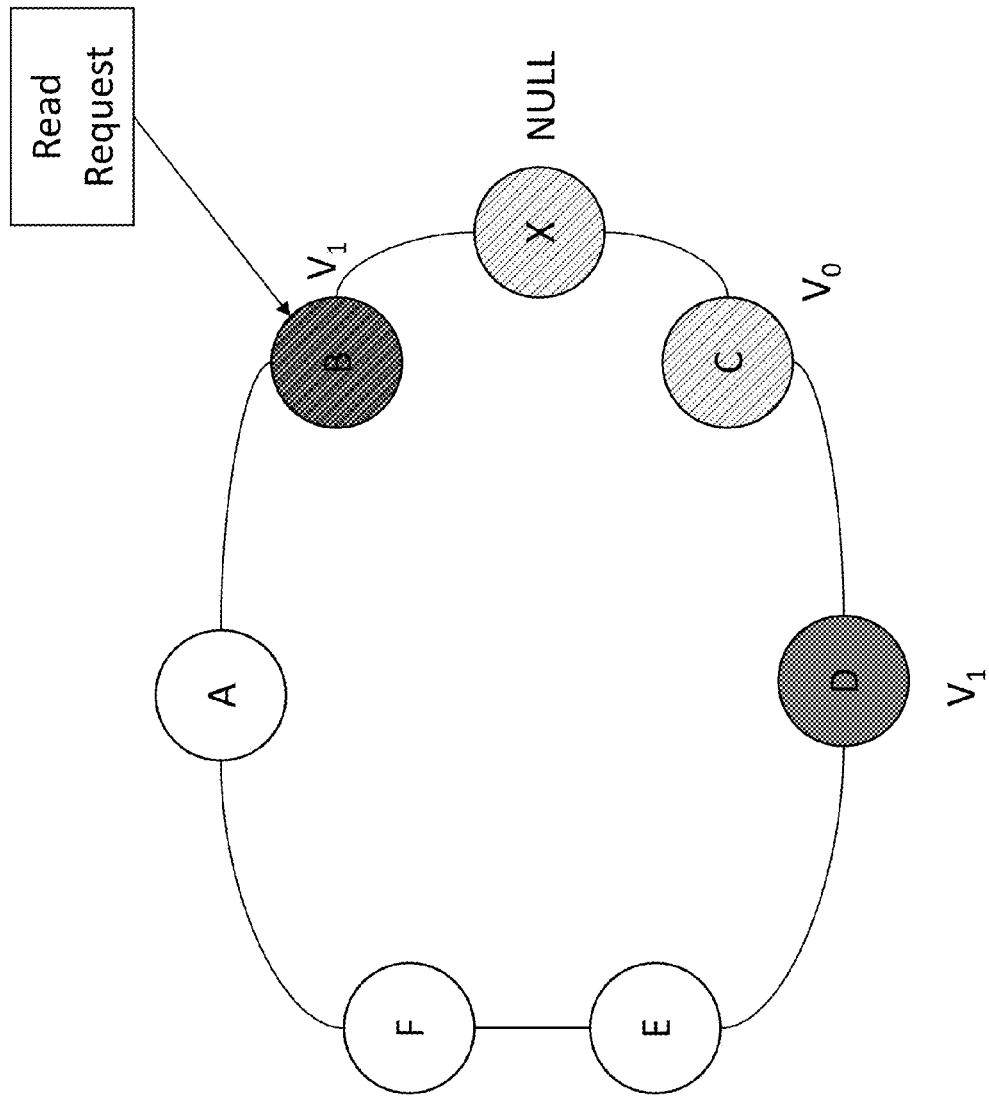

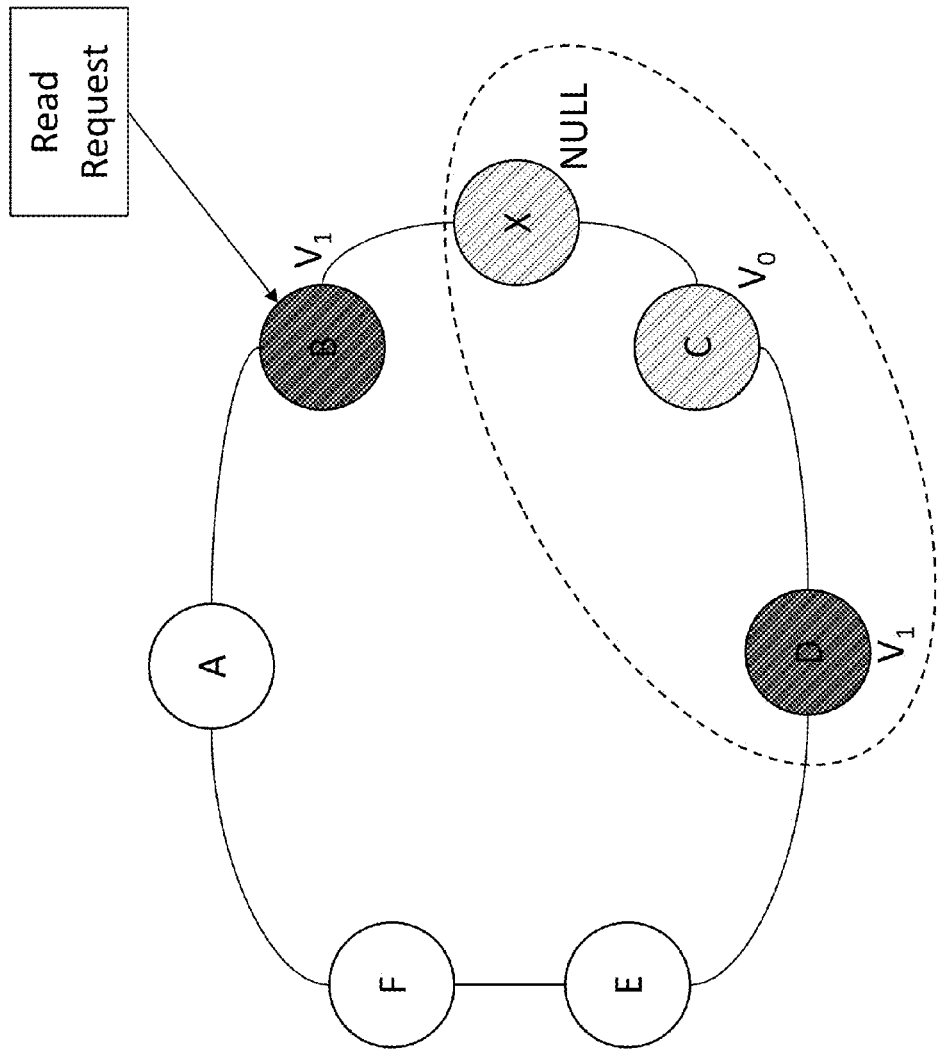

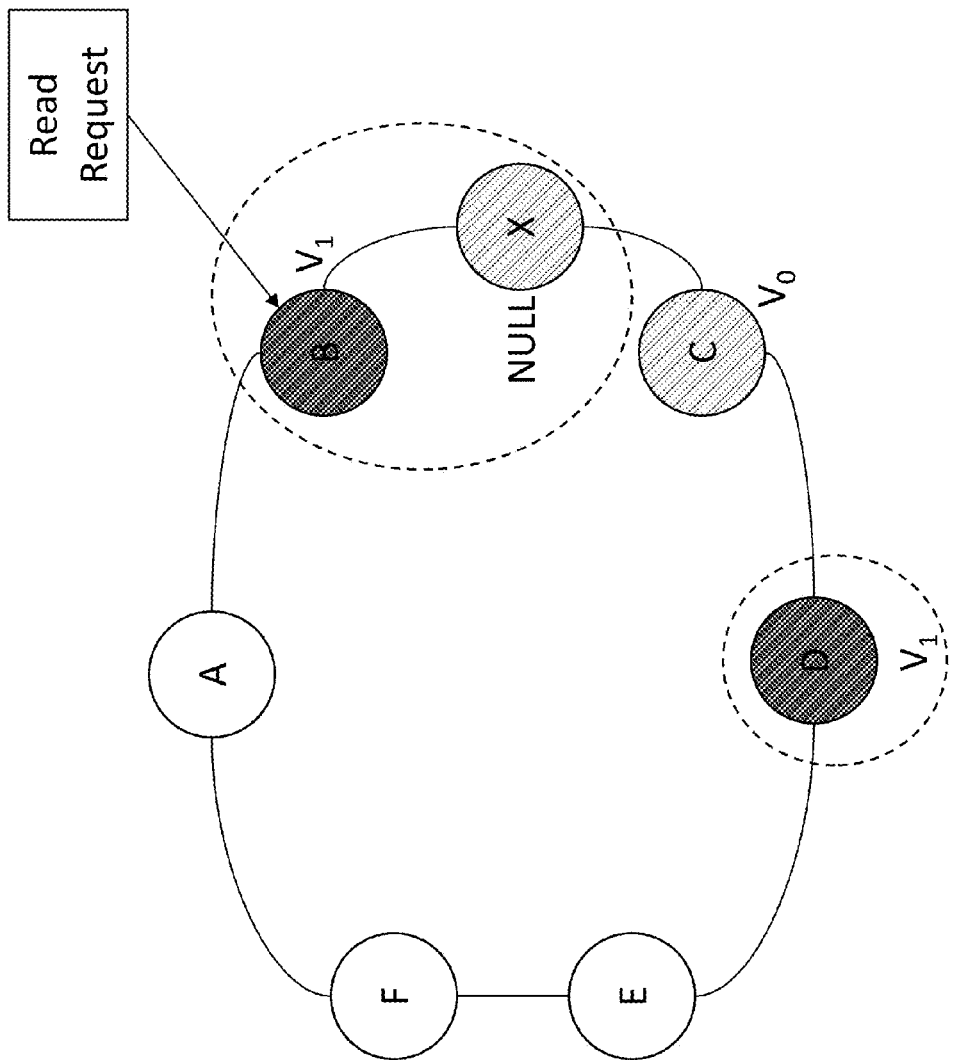

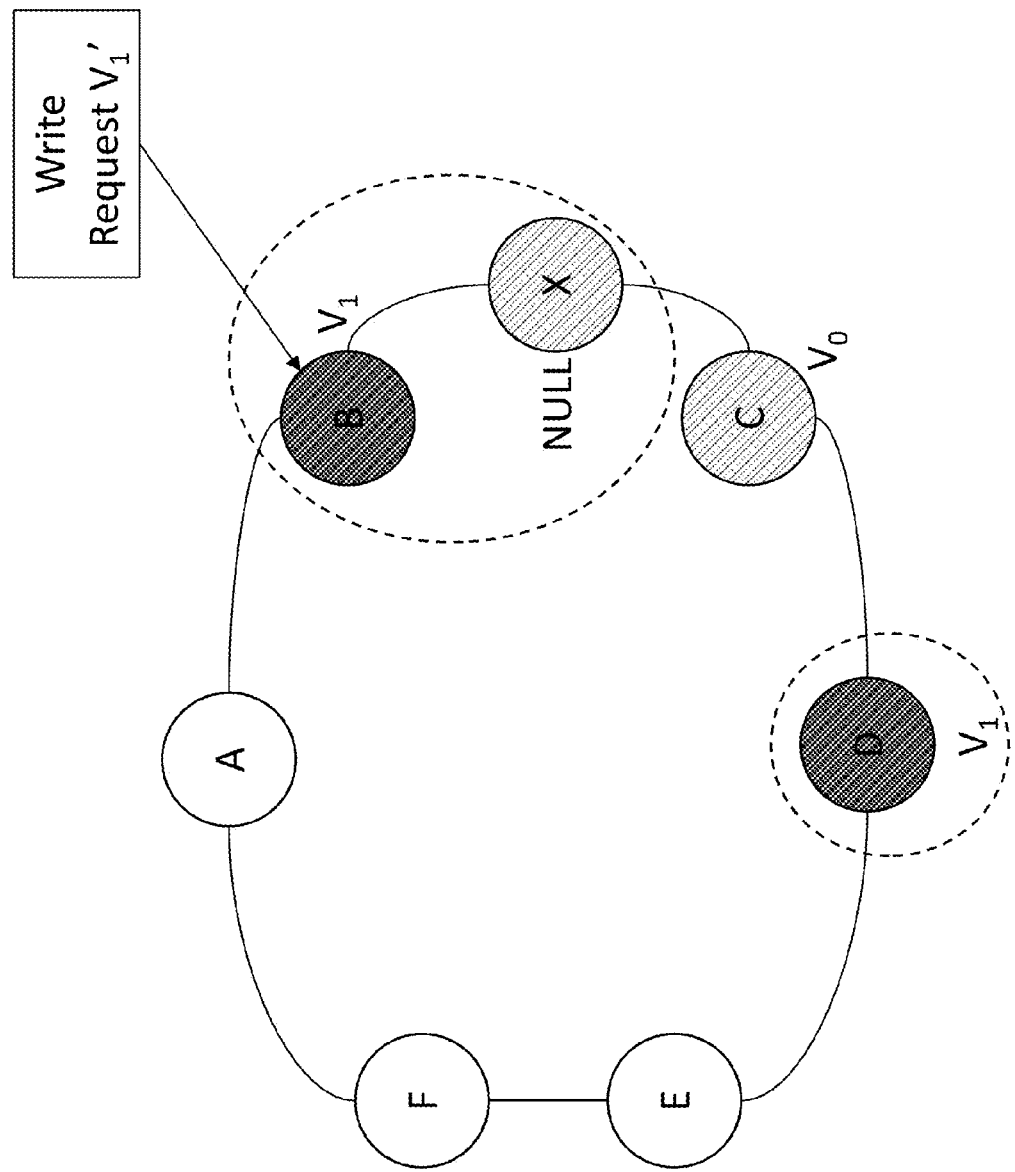

METHOD AND SYSTEM FOR MAINTAINING CONSISTENCY FOR I/O OPERATIONS ON METADATA DISTRIBUTED AMONGST NODES IN A RING STRUCTURE

CROSS REFERENCE TO RELATED APPLICATIONS

This present application claims the benefit of U.S. Provisional Application No. 61/786,478, filed Mar. 15, 2013, which is hereby incorporated by reference in its entirety.

The present application is related to application Ser. No. 13/207,345, filed on Aug. 10, 2011, entitled "ARCHITECTURE FOR MANAGING I/O AND STORAGE FOR A VIRTUALIZATION ENVIRONMENT", application Ser. No. 13/207,357, filed on Aug. 10, 2011, entitled "METADATA FOR MANAGING I/O AND STORAGE FOR A VIRTUALIZATION ENVIRONMENT", application Ser. No. 13/207,365, filed on Aug. 10, 2011, entitled "METHOD AND SYSTEM FOR IMPLEMENTING A MAINTENANCE SERVICE FOR MANAGING I/O AND STORAGE FOR A VIRTUALIZATION ENVIRONMENT", application Ser. No. 13/207,371, filed Aug. 10, 2011, entitled "METHOD AND SYSTEM FOR IMPLEMENTING WRITABLE SNAPSHOTS IN A VIRTUALIZED STORAGE ENVIRONMENT", and application Ser. No. 13/207,375, filed Aug. 10, 2011, entitled "METHOD AND SYSTEM FOR IMPLEMENTING A FAST CONVOLUTION FOR COMPUTING APPLICATIONS", and which are all hereby incorporated by reference in their entirety.

FIELD

This disclosure concerns a method and system for maintaining consistency of read/write operations for a virtualization environment.

BACKGROUND

A "virtual machine" or a "VM" refers to a specific software-based implementation of a machine in a virtualization environment, in which the hardware resources of a real computer (e.g., CPU, memory, etc.) are virtualized or transformed into the underlying support for the fully functional virtual machine that can run its own operating system and applications on the underlying physical resources just like a real computer.

Virtualization works by inserting a thin layer of software directly on the computer hardware or on a host operating system. This layer of software contains a virtual machine monitor or "hypervisor" that allocates hardware resources dynamically and transparently. Multiple operating systems run concurrently on a single physical computer and share hardware resources with each other. By encapsulating an entire machine, including CPU, memory, operating system, and network devices, a virtual machine is completely compatible with most standard operating systems, applications, and device drivers. Most modern implementations allow several operating systems and applications to safely run at the same time on a single computer, with each having access to the resources it needs when it needs them.

Virtualization allows one to run multiple virtual machines on a single physical machine, with each virtual machine sharing the resources of that one physical computer across multiple environments. Different virtual machines can run different operating systems and multiple applications on the same physical computer.

One reason for the broad adoption of virtualization in modern business and computing environments is because of the resource utilization advantages provided by virtual machines. Without virtualization, if a physical machine is limited to a single dedicated operating system, then during periods of inactivity by the dedicated operating system the physical machine is not utilized to perform useful work. This is wasteful and inefficient if there are users on other physical machines which are currently waiting for computing resources. To address this problem, virtualization allows multiple VMs to share the underlying physical resources so that during periods of inactivity by one VM, other VMs can take advantage of the resource availability to process workloads. This can produce great efficiencies for the utilization of physical devices, and can result in reduced redundancies and better resource cost management.

Data Centers are typically architected as diskless computers ("application servers") talking to a set of networked storage appliances ("storage servers") via a Fiber Channel or Ethernet network. A storage server exposes volumes that are mounted by the application servers for their storage needs. If the storage server is a block-based server, it exposes a set of volumes that are also called Logical Unit Numbers (LUNs). If, on the other hand, a storage server is file-based, it exposes a set of volumes that are also called file systems. Either way, a volume is the smallest unit of administration for a storage device, e.g., a storage administrator can set policies to backup, snapshot, RAID-protect, or WAN-replicate a volume, but cannot do the same operations on a region of the LUN, or on a specific file in a file system.

Storage devices comprise one type of physical resources that can be managed and utilized in a virtualization environment. For example, VMWare is a company that provides products to implement virtualization, in which networked storage devices are managed by the VMWare virtualization software to provide the underlying storage infrastructure for the VMs in the computing environment. The VMWare approach implements a file system (VMFS) that exposes emulated storage hardware to the VMs. The VMWare approach uses VMDK "files" to represent virtual disks that can be accessed by the VMs in the system. Effectively, a single volume can be accessed and shared among multiple VMs.

While this known approach does allow multiple VMs to perform I/O activities upon shared networked storage, there are also numerous drawbacks and inefficiencies with this approach. For example, because the VMWare approach is reliant upon the VMFS file system, administration of the storage units occurs at a too-broad level of granularity. While the virtualization administrator needs to manage VMs, the storage administrator is forced to manage coarse-grained volumes that are shared by multiple VMs. Configurations such as backup and snapshot frequencies, RAID properties, replication policies, performance and reliability guarantees etc. continue to be at a volume level, and that is problematic. Moreover, this conventional approach does not allow for certain storage-related optimizations to occur in the primary storage path.

Therefore, there is a need for an improved approach to implement I/O and storage device management in a virtualization environment.

SUMMARY

Some embodiments of the present invention are directed to a method for maintaining consistency for I/O operations on metadata distributed amongst a plurality of nodes forming a ring structure.

Further details of aspects, objects, and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 3 is a flow chart illustrating a method for performing a write operation for metadata on a node configured in a ring structure.

FIGS. 4a-d are schematic diagrams illustrating a method for performing a write operation for metadata on a node configured in a ring structure.

FIGS. 6a-d are schematic diagrams illustrating a method for performing a subsequent read operation for metadata on a node after a previous write operation for the metadata has been committed for that node, where no new nodes are introduced into the ring structure prior to performing the subsequent read operation.

FIG. 8 is a flow diagram illustrating a method for ensuring the return of the most up to date metadata values for a read operation for metadata when a new node is introduced into the ring structure at a time between a completed write operation for the metadata and the read operation for the metadata before the new node has been updated with the most up to date metadata values.

FIGS. 9a-g are schematic diagrams illustrating a method for ensuring the return of the most up to date metadata values for a read operation for metadata when a new node is introduced into the ring structure at a time between a completed write operation for the metadata and the read operation for the metadata before the new node has been updated with the most up to date data values.

FIGS. 12a-g are schematic diagrams illustrating this method for ensuring the rejection of a subsequent write operation attempting to write new metadata with the same version information as the most up to date metadata when a new node is introduced into the ring structure at a time between a completed write operation for the most up to date metadata and the subsequent write operation for the new metadata before the new node has been updated with the most up to date metadata values.

DETAILED DESCRIPTION OF THE EMBODIMENTS OF THE INVENTION

Figure 1A:
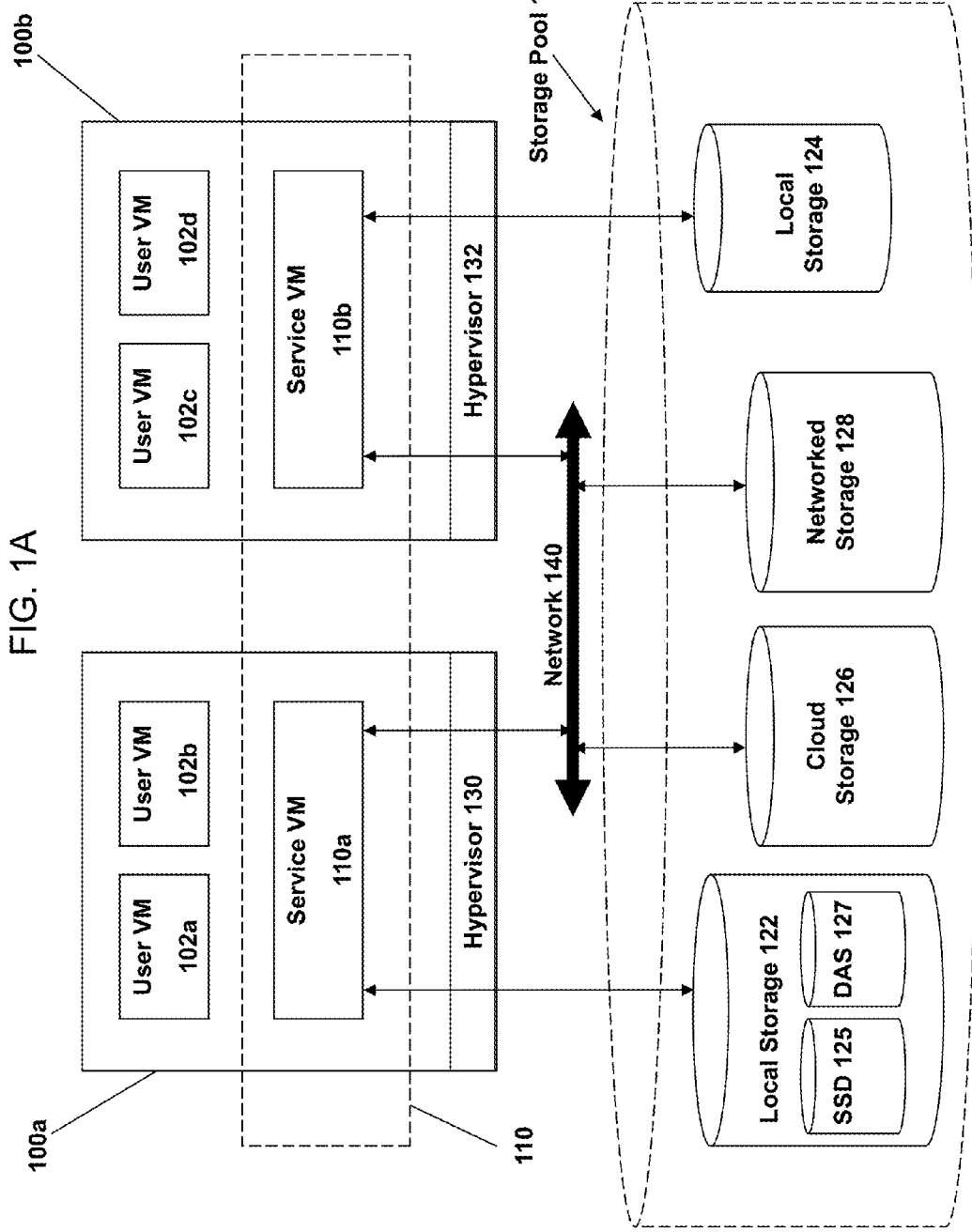
FIG. 1A illustrates an example architecture to implement I/O and storage device management in a virtualization environment according to some embodiments of the invention.

FIG. 1A illustrates an architecture for implementing storage management in a virtualization environment according to some embodiments of the invention. The architecture of FIG. 1A can be implemented for a distributed platform that contains multiple servers 100a and 100b that manages multiple-tiers of storage. Like the prior art, the multiple tiers of storage includes storage that is accessible through a network 140, such as cloud storage 126 or networked storage 128 (e.g., a SAN or "storage area network"). Unlike the prior art, the present embodiment also permits management of local storage 122/124 that is within or directly attached to the server and/or appliance. Examples of such storage include SSDs 125 ("Solid State Drives") or HDDs ("hard disk drives") 127. These collected storage devices, both local and networked, form a storage pool 160. Virtual disks (or "vDisks") can be structured from the storage devices in the storage pool 160, as described in more detail below. As used herein, the term vDisk refers to the storage abstraction that is exposed by a Service VM to be used by a user VM. In some embodiments, the vDisk is exposed via iSCSI ("internet small computer system interface") or NFS ("network file system") and is mounted as a virtual disk on the user VM.

Each server 100a or 100b runs virtualization software, such as the ESX product available from VMWare. The virtualization software includes a hypervisor 130/132 to manage the interactions between the underlying hardware and the one or more user VMs 102a, 102b, 102c, and 102d that run client software.

A special VM 110a/110b is used to manage storage and I/O activities according to some embodiment of the invention, which is referred to herein as a "Service VM". The term "Service VM" may otherwise be referred to as "Controller VM". The Service VMs 110a/110b are not formed as part of specific implementations of hypervisors 130/132. Instead, the Service VMs run as virtual machines in the hypervisors 130/132 on the various servers 102a and 102b, and work together to form a distributed system 110 that manages all the storage resources, including the locally attached storage 122/124, the networked storage 128, and the cloud storage 126. Since the Service VMs run above the hypervisors 130/132, this means that the current approach can be used and implemented within any virtual machine architecture, since the Service VMs of embodiments of the invention can be used in conjunction with any hypervisor from any virtualization vendor.

Each Service VM 110a-b exports one or more block devices or NFS server targets that appear as disks to the client VMs 102a-d. These disks are virtual, since they are implemented by the software running inside the Service VMs 110a-b. Thus, to the user VMs 102a-d, the Service VMs 110a-b appear to be exporting a clustered storage appliance that contains some disks. All user data (including the operating system) in the client VMs 102a-d resides on these virtual disks.

Significant performance advantages can be gained by allowing the virtualization system to access and utilize local (server-internal) storage 122 as disclosed herein. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization system is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Yet another advantage of the present embodiment of the invention is that storage-related optimizations for access and storage of data can be implemented directly within the primary storage path. For example, in some embodiments of the invention, the Service VM 110a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Service VMs include quality of service (QoS) functions, encryption, and compression. The new architecture massively parallelizes storage, by placing a storage controller—in the form of a Service VM—at each hypervisor, and thus makes it possible to render enough CPU and memory resources to achieve the aforementioned optimizations.

Figure 1B:
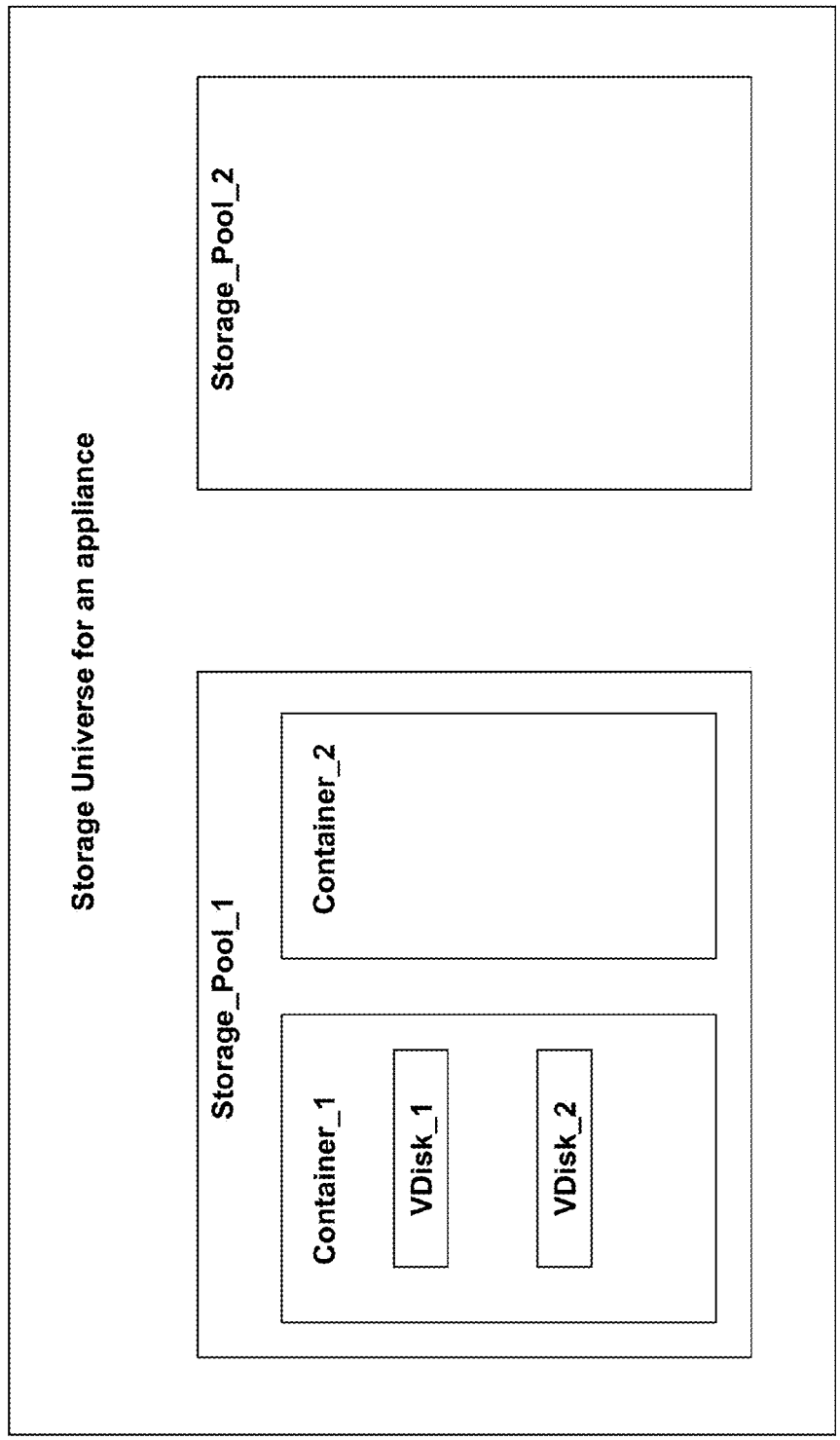
FIG. 1B illustrates a storage hierarchy according to some embodiments of the invention.

For easy management of the appliance, the storage is divided up into abstractions that have a hierarchical relationship to each other. FIG. 1B illustrates the storage hierarchy of the storage objects according to some embodiments of the invention, where all storage in the storage appliance collectively forms a Storage Universe. These storage devices may encompass any suitable devices, such as server-local SSDs or HDDs, network-attached SAN or Cloud storage.

Storage with similar characteristics is classified into tiers. Thus, all SSDs can be classified into a first tier and all HDDs may be classified into another tier etc. In a heterogeneous system with different kinds of HDDs, one may classify the disks into multiple HDD tiers. This action may similarly be taken for SAN and cloud storage.

The storage universe is divided up into storage pools—essentially a collection of specific storage devices. An administrator may be responsible for deciding how to divide up the storage universe into storage pools. For example, an administrator may decide to just make just one storage pool with all the disks in the storage universe in that pool. However, the principal idea behind dividing up the storage universe is to provide mutual exclusion when accessing the disk resources.

This may be one approach that can be taken to implement QoS techniques. For example, one rogue user may result in lots of random IO activity on a hard disk—thus if other users are doing sequential IO, they still might get hurt by the rogue user. Enforcing exclusion through storage pools might be used to provide hard guarantees for premium users. Another reason to use a storage pool might be to reserve some disks for later use.

As noted above, the Service VM is the primary software component within the server that virtualizes I/O access to hardware resources within a storage pool according to embodiments of the invention. This approach essentially provides for a separate and dedicated controller for each and every node within a virtualized data center (a cluster of nodes that run some flavor of hypervisor virtualization software), since each node will include its own Service VM. This is in contrast to conventional storage architectures that provide for a limited number of storage controllers (e.g., four controllers) to handle the storage workload for the entire system, and hence results in significant performance bottlenecks due to the limited number of controllers. Unlike the conventional approaches, each new node will include a Service VM to share in the overall workload of the system to handle storage tasks. Therefore, the current approach is infinitely scalable, and provides a significant advantage over the conventional approaches that have a limited storage processing power. Consequently, the currently described approach creates a massively-parallel storage architecture that scales as and when hypervisor hosts are added to a datacenter.

Figure 2:
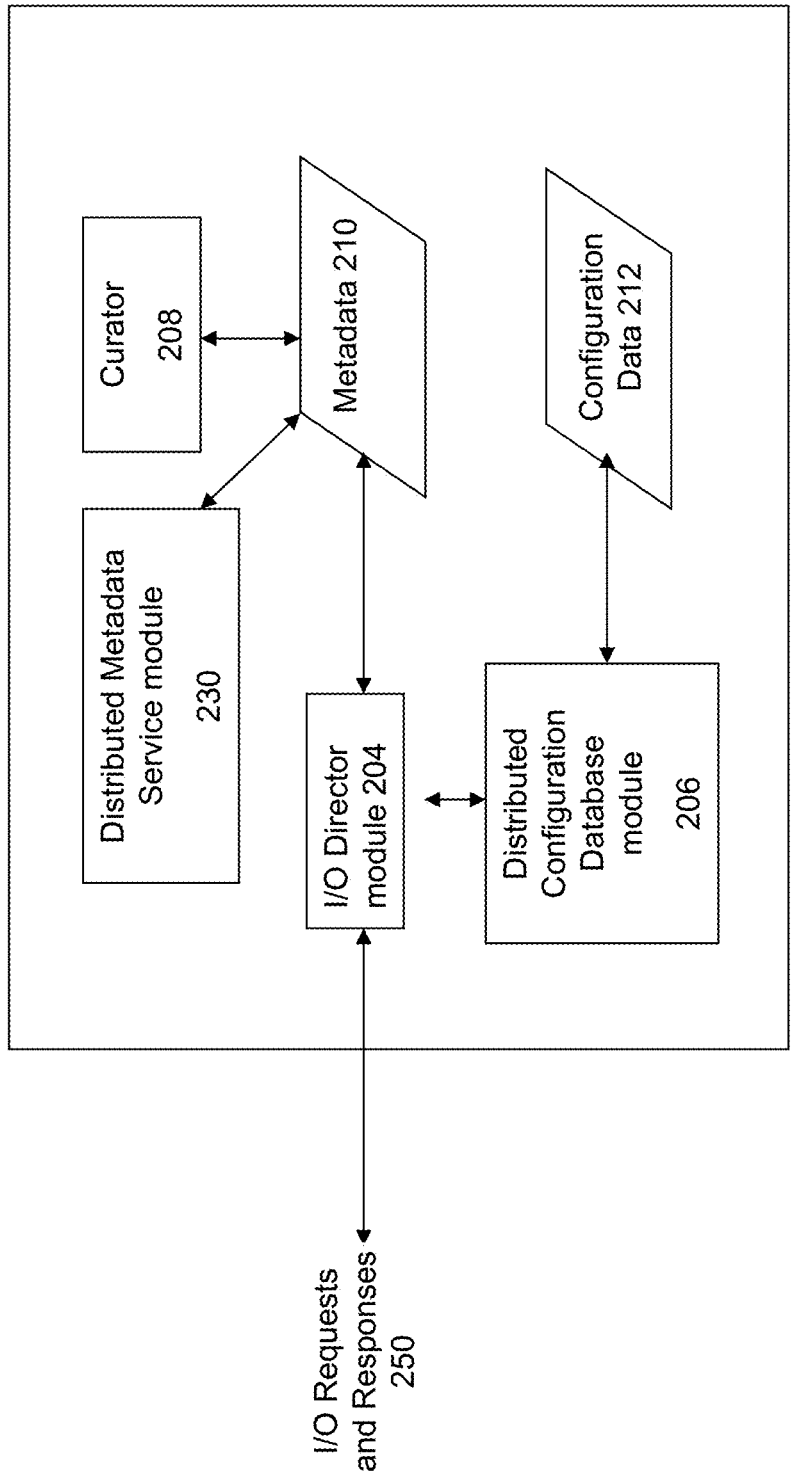
FIG. 2 illustrates the internal structures of a Service VM according to some embodiments of the invention.

FIG. 2 illustrates the internal structures of a Service VM according to some embodiments of the invention. As previously noted, the Service VMs are not formed as part of specific implementations of hypervisors. Instead, the Service VMs run as virtual machines above hypervisors on the various nodes. Since the Service VMs run above the hypervisors, this means that the current approach can be used and implemented within any virtual machine architecture, since the Service VMs of embodiments of the invention can be used in conjunction with any hypervisor from any virtualization vendor. Therefore, the Service VM can be configured to operate ubiquitously anywhere within the computing environment, and will not need to be custom-configured for each different type of operating environment. This is particularly useful because the industry-standard iSCSI or NFS protocols allow the Service VM to be hypervisor-agnostic.

The main entry point into the Service VM is the central controller module 304 (which is referred to here as the "I/O Director module 204"). The term I/O Director module is used to connote that fact that this component directs the I/O from the world of virtual disks to the pool of physical storage resources. In some embodiments, the I/O Director module implements the iSCSI or NFS protocol server.

A write request originating at a user VM would be sent to the iSCSI or NFS target inside the service VM's kernel. This write would be intercepted by the I/O Director module 204 running in user space. I/O Director module 204 interprets the iSCSI LUN or the NFS file destination and converts the request into an internal "vDisk" request (e.g., as described in more detail below). Ultimately, the I/O Director module 204 would write the data to the physical storage.

Each vDisk managed by a Service VM corresponds to a virtual address space forming the individual bytes exposed as a disk to user VMs. Thus, if the vDisk is of size 1 TB, the corresponding address space maintained by the invention is 1 TB. This address space is broken up into equal sized units called vDisk blocks. Metadata 210 is maintained by the Service VM to track and handle the vDisks and the data and storage objects in the system that pertain to the vDisks. The Metadata 210 is used to track and maintain the contents of the vDisks and vDisk blocks.

In order to determine where to write and read data from the storage pool, the I/O Director module 204 communicates with a Distributed Metadata Service module 230 that maintains all the metadata 210. In some embodiments, the Distributed Metadata Service module 230 is a highly available, fault-tolerant distributed service that runs on all the Service VMs in the appliance. The metadata managed by Distributed Metadata Service module 230 is itself kept on the persistent storage attached to the appliance. According to some embodiments of the invention, the Distributed Metadata Service module 230 may be implemented on SSD storage.

Since requests to the Distributed Metadata Service module 230 may be random in nature, SSDs can be used on each server node to maintain the metadata for the Distributed Metadata Service module 230. The Distributed Metadata Service module 230 stores the metadata that helps locate the actual content of each vDisk block. If no information is found in Distributed Metadata Service module 230 corresponding to a vDisk block, then that vDisk block is assumed to be filled with zeros. The data in each vDisk block is physically stored on disk in contiguous units called extents. Extents may vary in size when de-duplication is being used. Otherwise, an extent size coincides with a vDisk block. Several extents are grouped together into a unit called an extent group. An extent group is then stored as a file on disk. The size of each extent group is anywhere from 16 MB to 64 MB. In some embodiments, an extent group is the unit of recovery, replication, and many other storage functions within the system.

Further details regarding methods and mechanisms for implementing Metadata 210 are described below and in co-pending application Ser. No. 13/207,357, which is hereby incorporated by reference in its entirety.

A health management module 208 (which may hereinafter be referred to as a "Curator") is employed to address and cure any inconsistencies that may occur with the Metadata 210. The Curator 208 oversees the overall state of the virtual storage system, and takes actions as necessary to manage the health and efficient performance of that system. According to some embodiments of the invention, the curator 208 operates on a distributed basis to manage and perform these functions, where a master curator on a first server node manages the workload that is performed by multiple slave curators on other server nodes. MapReduce operations are performed to implement the curator workload, where the master curator may periodically coordinate scans of the metadata in the system to manage the health of the distributed storage system. Further details regarding methods and mechanisms for implementing Curator 208 are disclosed in co-pending application Ser. No. 13/207,365, which is hereby incorporated by reference in its entirety.

Some of the Service VMs also includes a Distributed Configuration Database module 206 to handle certain administrative tasks. The primary tasks performed by the Distributed Configuration Database module 206 are to maintain configuration data 212 for the Service VM and act as a notification service for all events in the distributed system. Examples of configuration data 212 include, for example, (1) the identity and existence of vDisks; (2) the identity of Service VMs in the system; (3) the physical nodes in the system; and (4) the physical storage devices in the system. For example, assume that there is a desire to add a new physical disk to the storage pool. The Distributed Configuration Database module 206 would be informed of the new physical disk, after which the configuration data 212 is updated to reflect this information so that all other entities in the system can then be made aware for the new physical disk. In a similar way, the addition/deletion of vDisks, VMs and nodes would handled by the Distributed Configuration Database module 206 to update the configuration data 212 so that other entities in the system can be made aware of these configuration changes.

Another task that is handled by the Distributed Configuration Database module 206 is to maintain health information for entities in the system, such as the Service VMs. If a Service VM fails or otherwise becomes unavailable, then this module tracks this health information so that any management tasks required of that failed Service VM can be migrated to another Service VM.

The Distributed Configuration Database module 206 also handles elections and consensus management within the system. Another task handled by the Distributed Configuration Database module is to implement ID creation. Unique IDs are generated by the Distributed Configuration Database module as needed for any required objects in the system, e.g., for vDisks, Service VMs, extent groups, etc. In some embodiments, the IDs generated are 64-bit IDs, although any suitable type of IDs can be generated as appropriate for embodiment so the invention. According to some embodiments of the invention, the Distributed Configuration Database module 206 may be implemented on an SSD storage because of the real-time guarantees required to monitor health events.

Metadata that provides information (e.g., where user VM data is stored) about user VM data may be stored on a particular node in the storage management virtualization environment and replicated on one or more other nodes in the storage management virtualization environment. A service VM may request for an I/O operation (e.g., read or write) to be performed on metadata residing at a node in the storage management virtualization environment by identifying the node at which the I/O operation is to be performed using a key. A hashing algorithm may then be applied to the key to determine the node on which to perform the I/O operation. I/O operations to write metadata to a node may be performed by writing metadata on a first node identified by the key using the hashing algorithm and further writing the metadata on one or more other replica nodes in accordance with a replication factor. This is to provide fault-tolerance, such that when the given node fails for whatever reason the metadata may still be accessed from the replica nodes. I/O operations to read metadata from a node may be performed by reading metadata from a given node and also reading metadata from replicated nodes in accordance with the replication factor. This is to help ensure that the metadata being read from a given node is accurate.

The nodes of the storage management virtualization environment are configured in a ring-structure such that the nodes of the storage management virtualization environment are logically connected in a ring. For a write operation, metadata is replicated on replica nodes within the ring structure immediately following the first node identified for the write operation. For a read operation, metadata is read from a first node identified by the read operation as well as from replica nodes immediately following the first identified node. The number of replica nodes utilized for performing an I/O operation is dependent on a replication factor.

When a user VM requests for an I/O operation (e.g., read or write) to be performed by using a key, the hashing algorithm may use the key to identify a first node on which the I/O operation is to be performed, and may also use the replication factor to identify the number of nodes immediately following the first node as replica nodes for the I/O operation.

For any I/O operation to be performed on metadata requested by a service VM, a quorum must be established prior to the I/O operation being successfully completed. A quorum refers to a subset of nodes within a set of nodes identified for the I/O operation that must agree prior to an I/O operation being successfully completed. For a set of N nodes identified for the I/O operation, a quorum is defined as a subset of N/2+1 nodes where N/2 is an integer division operation. For a write operation, a quorum must be established amongst the subset of nodes prior to the metadata associated with the write operation being committed. For a read operation, a quorum must be established amongst the subset of nodes prior to the metadata being returned to the user VM. For I/O operations, a quorum is established using a subset (N/2+1) of the set of nodes identified for the I/O operation.

When a new node is introduced into a virtualization environment after a write operation has been successfully completed, issues may arise when a subsequent read operation is requested that causes the new node to be identified as part of the set of nodes on which to perform the read operation. For example, when a new node is introduced after the completion of a write operation at a position immediately following the first node identified for the write operation, the new node may be recognized as a replica node for a subsequent read operation, and thus may participate in the subset used establish a quorum for the subsequent read operation. This becomes problematic when the new node participates in the subset used to establish the quorum for the subsequent read operation before the new node has been updated with the most up to date data values. This will be discussed in greater detail in the description to follow.

Establishing a quorum prior to performing a write operation on a node and its replica nodes and subsequently establishing a quorum prior to performing a read operation on the same node without introducing any new nodes into the ring structure ensures that the most up to date metadata value will be returned for the subsequent read operation. FIGS. 3, 4a-d, 5, and 6a-d will be used to illustrate such read/write operations on nodes of a ring structure where no new nodes are introduced into the ring structure between a write operation and a subsequent read operation.

FIG. 3 is a flow chart illustrating a method for performing a write operation for metadata on a node configured in a ring structure. Initially, a service VM requests for a write operation of metadata to be performed at a node as shown at 301. The request includes a key which is used to help identify the first node on which the write operation is to be performed. A hashing algorithm is applied to the key to determine the first node on which to perform the I/O operation.

Replica nodes on which to perform the write operation are then identified based on a replication factor as shown at 303. Nodes immediately following the first node within the ring structure are identified as the replica nodes for which the write operation should also be performed. When the nodes are configured in a ring structure a total set of nodes (i.e., first node and replica nodes) equal to the replication factor are identified for performing the write operation. Thus, the total number of replica nodes is equal to the replication factor minus one. For example, where the replication factor is 3, the 2 nodes immediately following the first node will serve as replica nodes for which the write operation is to also be performed on.

A quorum must then be established amongst the set of nodes for the write operation to be committed as shown at 305. For example, where the replication factor is 3, the total set of nodes is 3 and the quorum is 2 (i.e., 3/2+1). Thus, two nodes of the total set (first node and replica nodes) must agree on the data that is written prior to the write operation being committed. The two nodes of the total set being used to establish quorum may be any two nodes of the total set, and need not include the first node. Even when one node of the set of nodes fails to write the metadata, so long as the other two nodes in the set agree, the write operation may be committed. For a node that fails to write the metadata at the time quorum is established, a background process is used to update the metadata for that node after quorum has been established.

These steps are illustrated in FIGS. 4a-d. FIGS. 4a-d are schematic diagrams illustrating a method for performing a write operation for metadata on a node configured in a ring structure. In FIGS. 4a-d, the set of nodes configured in a ring structure include nodes A, B, C, D, E and F. For purposes of example, the method illustrated in FIGS. 4a-d will be made with reference to a replication factor of 3.

A service VM may request to perform a write operation of metadata value $V_1$ on a node of the set of nodes using a key. A hashing algorithm is applied to the key to identify the node on which the write operation is to be performed. The replication factor is then used to identify replica nodes on which the write operation is to be performed. In FIG. 4a, the hashing algorithm applied to the key identifies node B as being the node on which the write operation is to be performed. Because the replication factor is 3, the 2 nodes (node C and D) immediately following node B within the ring structure are identified as the replica nodes on which the write operation is to also be performed. The set of nodes on which the write operation is to be performed thus includes nodes B, C and D. Prior to the write operation being performed, all nodes (B, C and D) which have been identified for the write operation have a data value $V_0$ dated earlier than the data value $V_1$ to be written.

The write operation requested by the service VM may be committed once a quorum is established amongst the set of nodes for which the write operation is to be performed. Because the replication factor is 3, the total set of nodes is 3 and the quorum is 2 (i.e., 3/2+1). Thus, at least two nodes out of the set of nodes B, C and D must successfully execute the write operation prior to the write operation being committed.

Figure 4B:
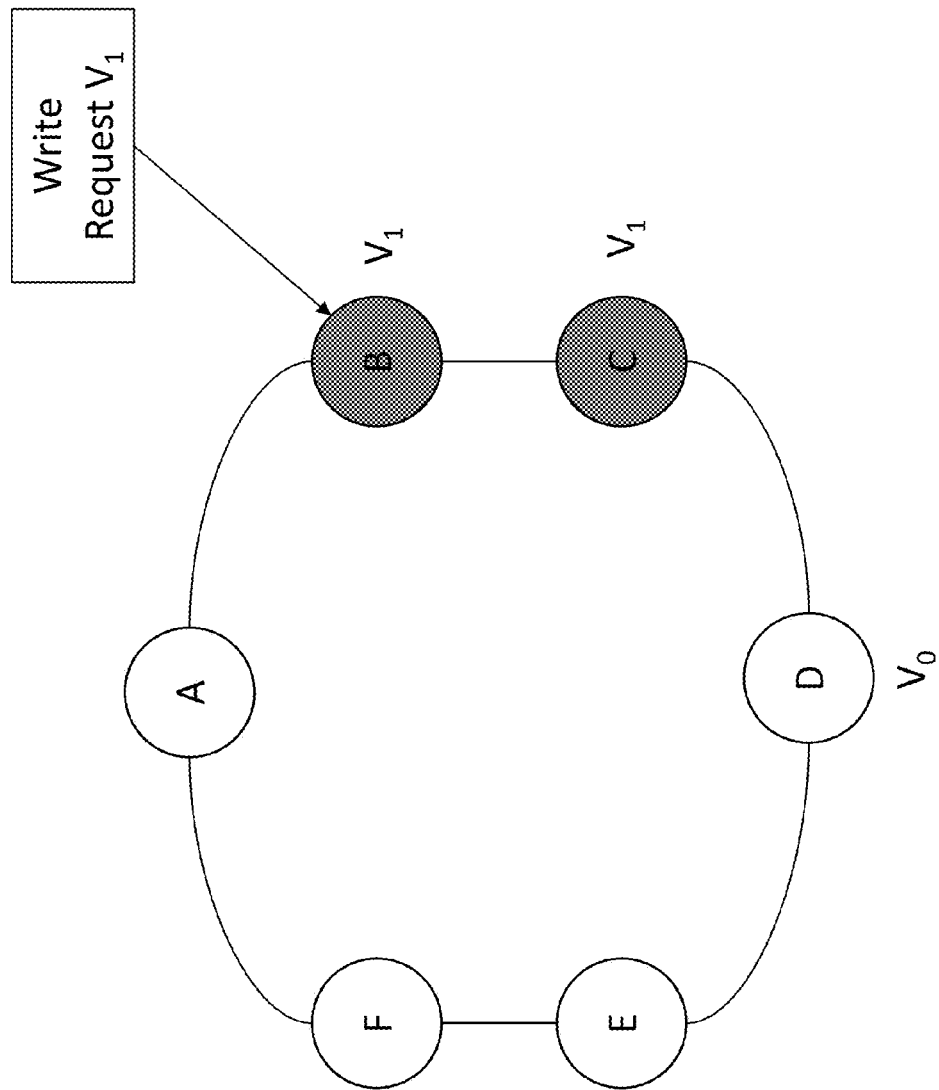

FIG. 4b illustrates an example of a quorum being established amongst the set of nodes. In FIG. 4b, nodes B and C have successfully written the metadata $V_1$ requested in the write operation while node D fails to successfully write the metadata requested in the write operation. Thus, nodes B and C have a most up to date metadata value $V_1$, while node D has an earlier dated metadata value $V_0$. The write operation is still committed because a quorum is established by node B and node C's successful execution of the write operation. A background process may be subsequently used to update the metadata value for node D after the quorum has been established.

Figure 4C:
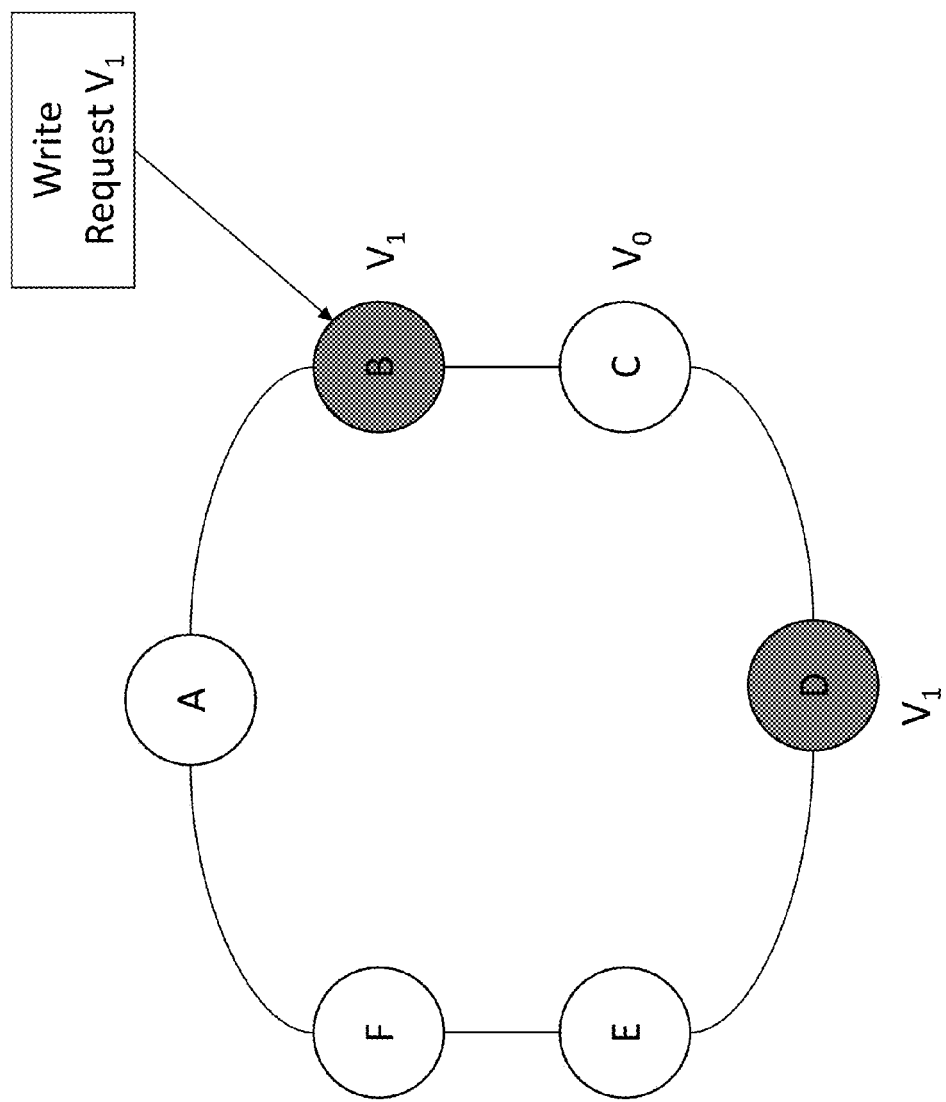

FIG. 4c illustrates another example of a quorum being established amongst the set of nodes. In FIG. 4c, nodes B and D have successfully written the metadata requested in the write operation while node C fails to successfully write the metadata requested in the write operation. Thus, nodes B and D have a most up to date metadata value $V_1$, while node C has an earlier dated metadata value $V_0$. The write operation is still committed because a quorum is established by node B and node D's successfully execution of the write operation. A background process may be subsequently used to update the metadata for node C after the quorum has been established.

FIG. 4d illustrates yet another example of a quorum being established amongst the set of nodes. In FIG. 4d, nodes C and D have successfully written the metadata requested in the write operation while node B fails to successfully write the metadata requested in the write operation. Thus, nodes C and D have a most up to date metadata value $V_1$, while node B has an earlier dated metadata value $V_0$. The write operation is still committed because a quorum is established by node C and node D's successful execution of the write operation. A background process may be subsequently used to update the metadata for node B after the quorum has been established.

By establishing a quorum prior to committing a write operation, it may be ensured that the metadata value returned in a subsequent read operation will be the correct metadata value (e.g., most up to date metadata value), so long as no new nodes are introduced into the ring structure prior to the subsequent read operation that may be identified as part of the set of nodes on which to perform the subsequent read operation.

Figure 5:
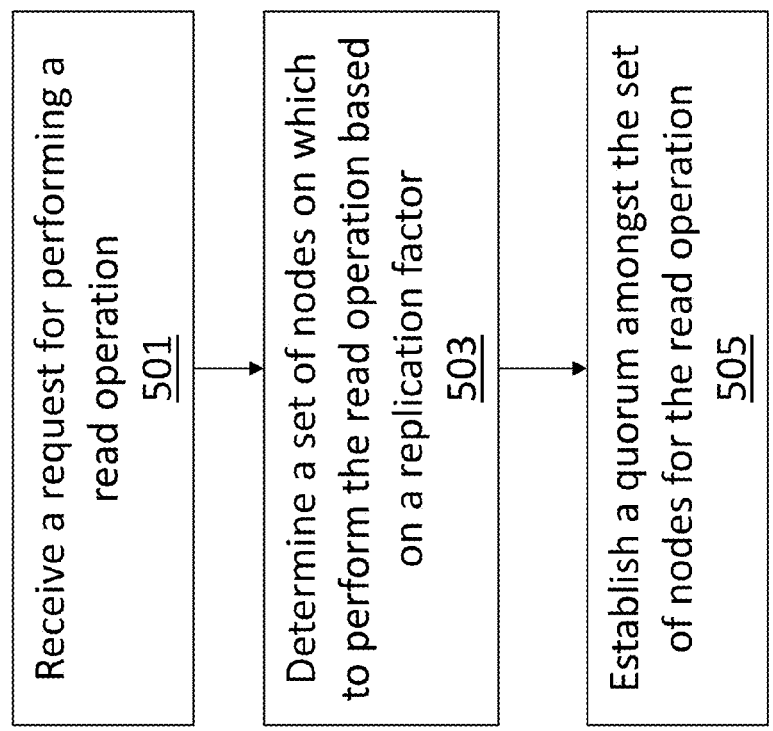
FIG. 5 is a flow chart illustrating a method for performing a subsequent read operation for metadata on a node after a previous write operation for the metadata has been committed for that node, where no new nodes are introduced into the ring structure prior to performing the subsequent read operation.

FIG. 5 is a flow chart illustrating a method for performing a subsequent read operation for metadata on a node after a previous write operation for the metadata has been committed for that node, where no new nodes are introduced into the ring structure prior to performing the subsequent read operation. Initially a request is made by a service VM for performing a read operation on metadata as shown at 501. The request includes a key which is used to help identify the first node on which the read operation is to be performed. A hashing algorithm is applied to the key to determine the first node on which to perform the I/O operation. For purposes of example, the first node identified for the read operation will be the same as the first node identified for the previous write operation.

Replica nodes on which to perform the read operation are then identified based on a replication factor as shown at 503. Nodes immediately following the first node within the ring structure are identified as the replica nodes for which the read operation should also be performed. When the nodes are configured in a ring structure a total set of nodes (i.e., first node and replica nodes) equal to the replication factor are identified for performing the read operation. Thus, the total number of replica nodes is equal to the replication factor minus one. For example, where the replication factor is 3, the 2 nodes immediately following the first node will serve as replica nodes for which the read operation is to also be performed on.

A quorum must then be established amongst the set of nodes for the read operation to be successfully executed as shown at 505. For example, where the replication factor is 3, the total set of nodes is 3 and the quorum is 2 (i.e., 3/2+1). Thus, two nodes of the set (first node and replica nodes) must agree on the data that is to be read prior to the read operation being successfully executed. Because a quorum was established for the previous write operation, at least two of the nodes identified for the read operation will have the most up to date metadata value for performing the subsequent read operation. Any two nodes out of the set of nodes identified for the read operation may be used to establish a quorum for the read operation.

If the set of two nodes used to establish the quorum for the read operation include both nodes with the most up to date metadata value, quorum may be immediately established using those two nodes and the read operation may be successfully executed.

If the set of two nodes used to establish the quorum include one node with the most up to date metadata value and one node with an earlier dated metadata value, the node with the earlier dated metadata value will automatically recognize that it must update its metadata value with the metadata value (e.g., most up to date metadata value) of the other node being used to establish quorum. The node with the earlier dated metadata value will learn of the most up to date metadata value from the other node being used to establish quorum. In some embodiments, each metadata value is stored along with version information (e.g., version identifier) such that nodes can compare their metadata values against each other in order to determine which metadata value is more up to date.

Once the node with the earlier dated metadata value updates its metadata value with the metadata value (e.g., most up to date metadata value) of the other node being used to establish quorum, then a quorum may be established using those two nodes and the read operation may be successfully executed. Because quorum was established for the previous write operation and no new nodes were introduced prior to the subsequent read operation, whenever two nodes that have different metadata values are used to establish the quorum for a subsequent read operation, it will be ensured that the node with the more up to date value of two nodes will have the correct value (e.g., most up to date value) for successfully completing the read operation. As such the node with the earlier dated metadata value can simply update its metadata value with the metadata value in the other node to establish quorum for successfully completing the read operation. This will be described in greater detail below with reference to FIGS. 6a-d.

FIGS. 6a-d are schematic diagrams illustrating a method for performing a subsequent read operation for metadata on a node after a previous write operation for the metadata has been committed for that node, where no new nodes are introduced into the ring structure prior to performing the subsequent read operation. The method for performing a subsequent read operation described in FIGS. 6a-d will follow from the write operation performed in FIG. 4c. For purposes of example, the method illustrated in FIGS. 6a-d will be made with reference to a replication factor of 3.

A service VM may request to perform a read operation on a node after a previous write operation has been committed for that node using a key. A hashing algorithm is applied to the key to identify the node on which the read operation is to be performed. The replication factor is then used to identify replica nodes on which the read operation is to be performed. In FIG. 6a, the hashing algorithm applied to the key identifies node B as being the node on which the read operation is to be performed. Because the replication factor is 3, the 2 nodes (node C and D) immediately following node B within the ring structure are identified as the replica nodes on which the read operation is to also be performed. The set of nodes on which the read operation is to be performed thus includes nodes B, C and D.

The subsequent read operation request follows from the write operation performed in FIG. 3c. As such, only nodes B and D include the most up to date metadata value $V_1$ for the read operation, while node C includes an earlier dated metadata value $V_0$.

A quorum must then be established amongst the set of nodes for the read operation to be successfully executed. Where the replication factor is 3, the total set of nodes is 3 and the quorum is 2 (i.e., 3/2+1). Thus, two nodes of the set (B, C and D) must agree on the metadata that is to be read prior to the read operation being successfully executed. Because a quorum was established by nodes B and D for the previous write operation, nodes B and D will have the most up to date metadata value $V_1$ for performing the read operation. Although only nodes B and D have the most up to date metadata value $V_1$ for performing the read operation, any two nodes out of the set (B, C and D) identified for the read operation may be used to establish a quorum for the read operation.

Figure 6B:
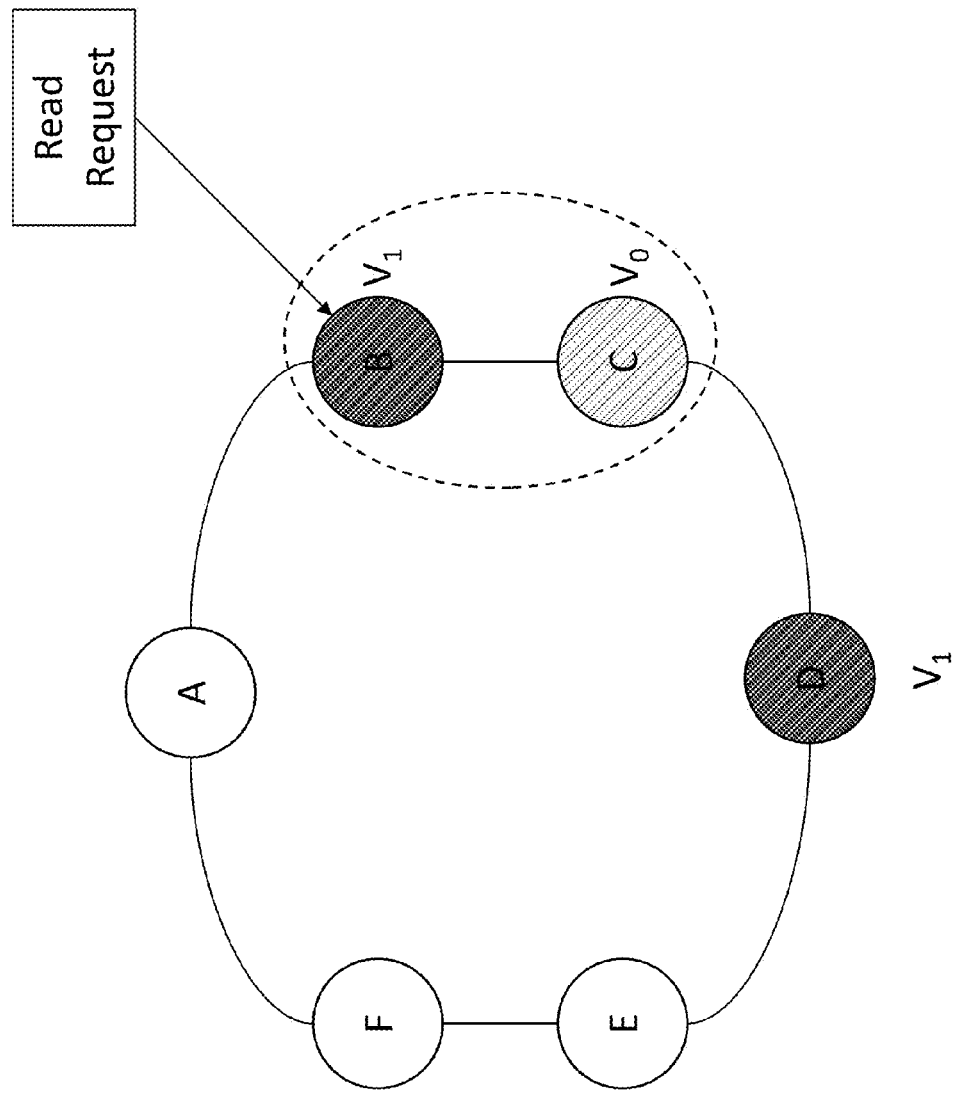

In FIG. 6b, nodes B and C are used to establish a quorum for the read operation. Node B has the most up to date metadata value $V_1$ and node C has an earlier dated metadata value $V_0$. As mentioned above, the node (e.g., node C) with the earlier dated metadata value $V_0$ will automatically recognize that it must update its metadata value $V_0$ with the metadata value $V_1$ stored in the other node being used to establish quorum. Node C may learn of the most up to date metadata value from node B using version information stored along with the metadata value. Thus, node C will automatically recognize that it must update its metadata value $V_0$ with the metadata value $V_1$ stored on node B. Once node C updates its metadata value with the metadata value stored on node B, then a quorum may be established using nodes B and C, and the read operation may be successfully executed.

Figure 6C:
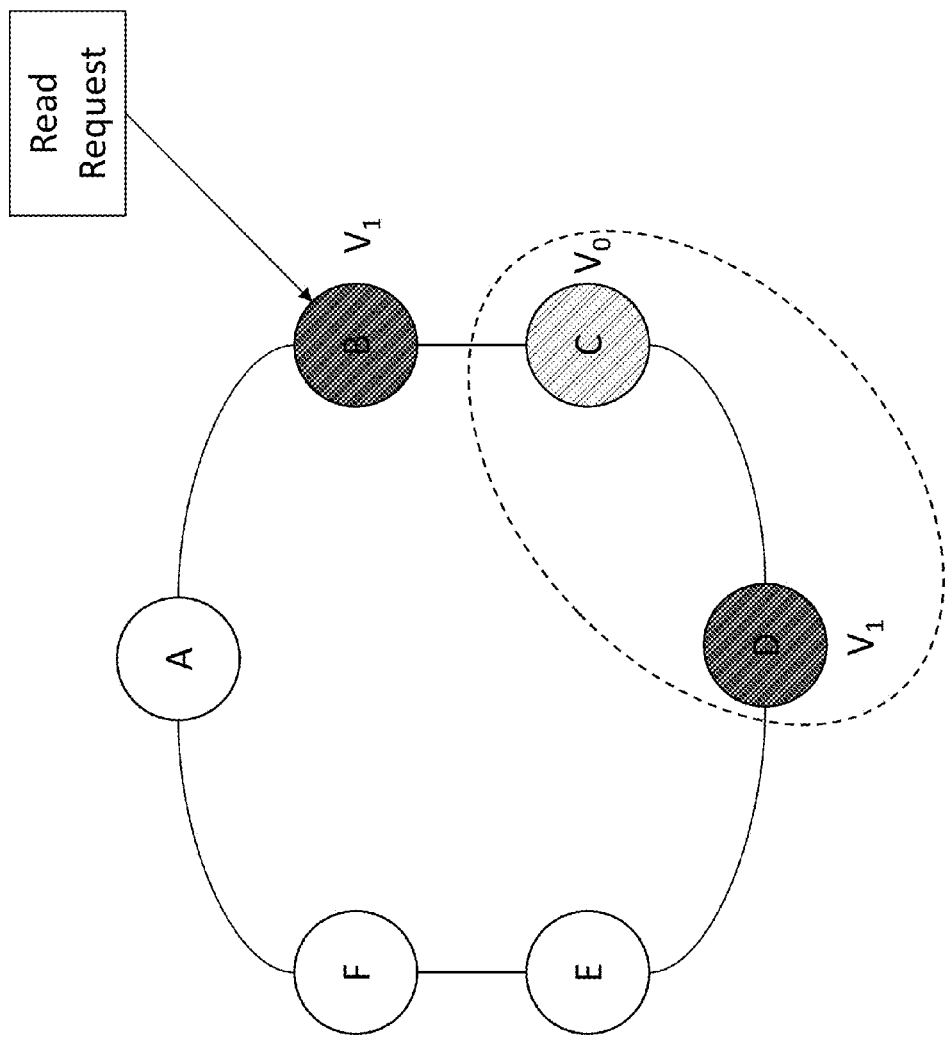

In FIG. 6c, nodes C and D are used to establish a quorum for the read operation. Node D has the most up to date metadata value $V_1$ and node C has an earlier dated metadata value $V_0$. As mentioned above, the node (e.g., node C) with the earlier dated metadata value $V_0$ will automatically recognize that it must update its metadata value with the metadata value $V_1$ stored in the other node being used to establish quorum. Node C may learn of the most up to date metadata value from node D using version information stored along with the metadata value. Thus, node C will automatically recognize that it must update its metadata value $V_0$ with the most up to date metadata value $V_1$ stored on node D. Once node C updates its metadata value $V_0$ with the metadata value $V_1$ stored on node D, then a quorum may be established using nodes C and D, and the read operation may be successfully executed.

Because quorum was established for the previous write operation and no new nodes were introduced prior to the subsequent read operation, whenever two nodes that have different metadata values are used to establish the quorum for a subsequent read operation, it will be ensured that at least one of the nodes will have the most up to date metadata value. As such the node with the earlier dated metadata value can simply update its metadata value with the metadata value in the other node to establish quorum for successfully completing the read operation.

Figure 6D:
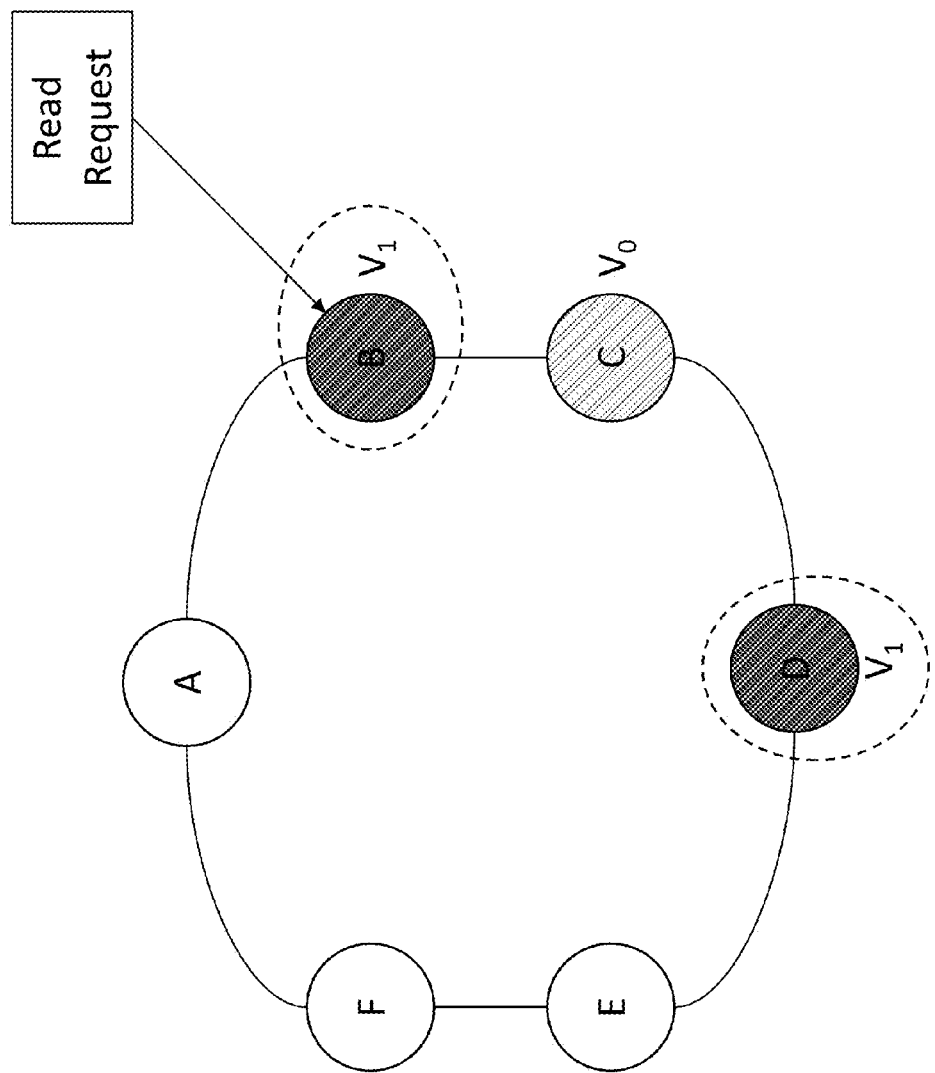

In FIG. 6d, nodes B and D are used to establish a quorum for the read operation. Nodes B and D both have the most up to date metadata value $V_1$. As mentioned above, because the set of two nodes (B and D) used to establish the quorum for the read operation include both nodes with the most up to date metadata value $V_1$, quorum may be immediately established using those two nodes and the read operation may be successfully executed.

When a new node is introduced into the ring structure at a time between a completed write operation and a subsequent read operation before the new node has been updated with the most up to date metadata values, issues may arise. Such issues may arise in the following context.

A write operation first identifies a set of nodes (first node and replica nodes) on which metadata is to be written and quorum is established amongst that set of nodes for successfully executing the write operation. Subsequently, a new node is introduced at a position immediately following the first node identified for the write I/O operation, such that the new node may be recognized as a replica node for a subsequent read operation, and thus may participate in establishing a quorum for the subsequent read operation. Before the new node has been updated with the most up to date metadata values by a background process, any read operations identifying the new node as part of the set of nodes for performing the subsequent read operation may potentially result in quorum being established that fails to return the most up to date metadata value to the requesting service VM. This problem is illustrated in FIGS. 7a-e.

FIGS. 7a-e are schematic diagrams illustrating a problem that arises when a new node is introduced into the ring structure at a time between a completed write operation for metadata and a subsequent read operation for that metadata before the new node has been updated with the most up to date metadata values. For purposes of example, FIGS. 7a-e will be described with reference to the successfully completed write operation of FIG. 4c. However, one ordinarily skilled in the art will recognize that the problem may arise for other node configurations associated with successfully completed write operations where a new node is introduced into the ring structure at a time between a completed write operation and a subsequent read operation before the new node has been updated with the most up to date metadata values.

Figure 7A:
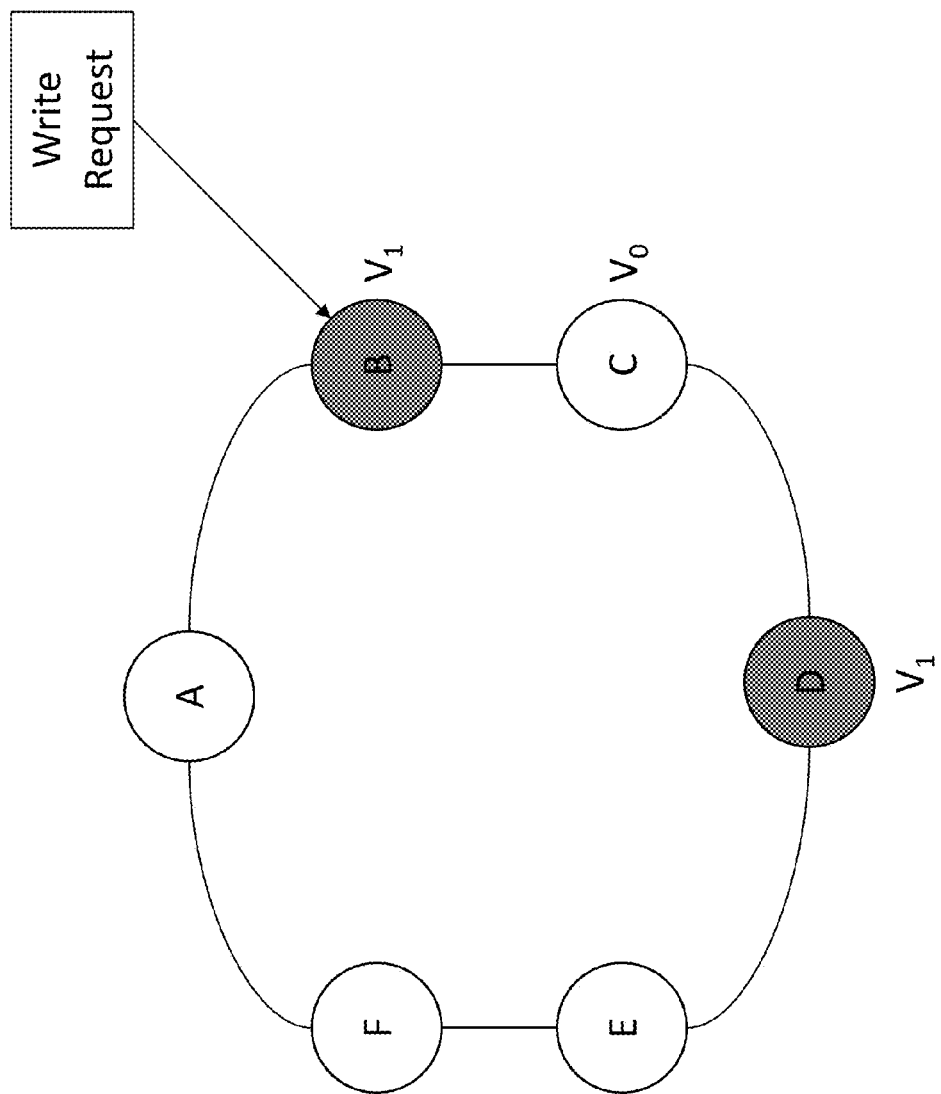
FIGS. 7a-e are schematic diagrams illustrating a problem that arises when a new node is introduced into the ring structure at a time between a completed write operation for metadata and a subsequent read operation for the metadata before the new node has been updated with the most up to date metadata values.

FIG. 7a illustrates the configuration of nodes in the ring structure after quorum has been established for successfully executing a write operation. In FIG. 7a, quorum was established for the write operation amongst the set of nodes B, C and D. Node B and Node D successfully wrote the metadata value $V_1$ requested in the write operation while node C failed to successfully write the metadata value $V_1$ requested in the write operation. Thus, nodes B and D have the most up to date metadata value $V_1$, while node C has an earlier dated metadata value $V_0$.

Figure 7B:
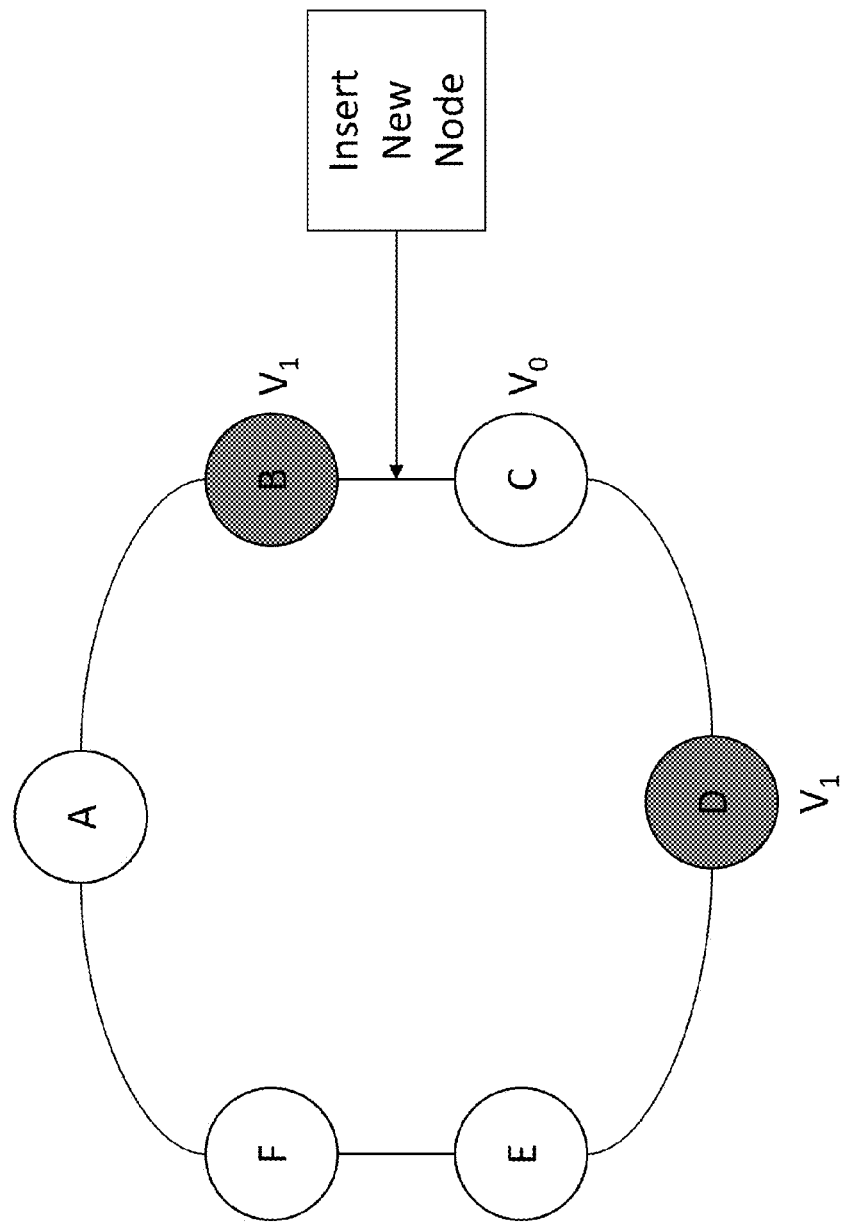
Figure 7C:
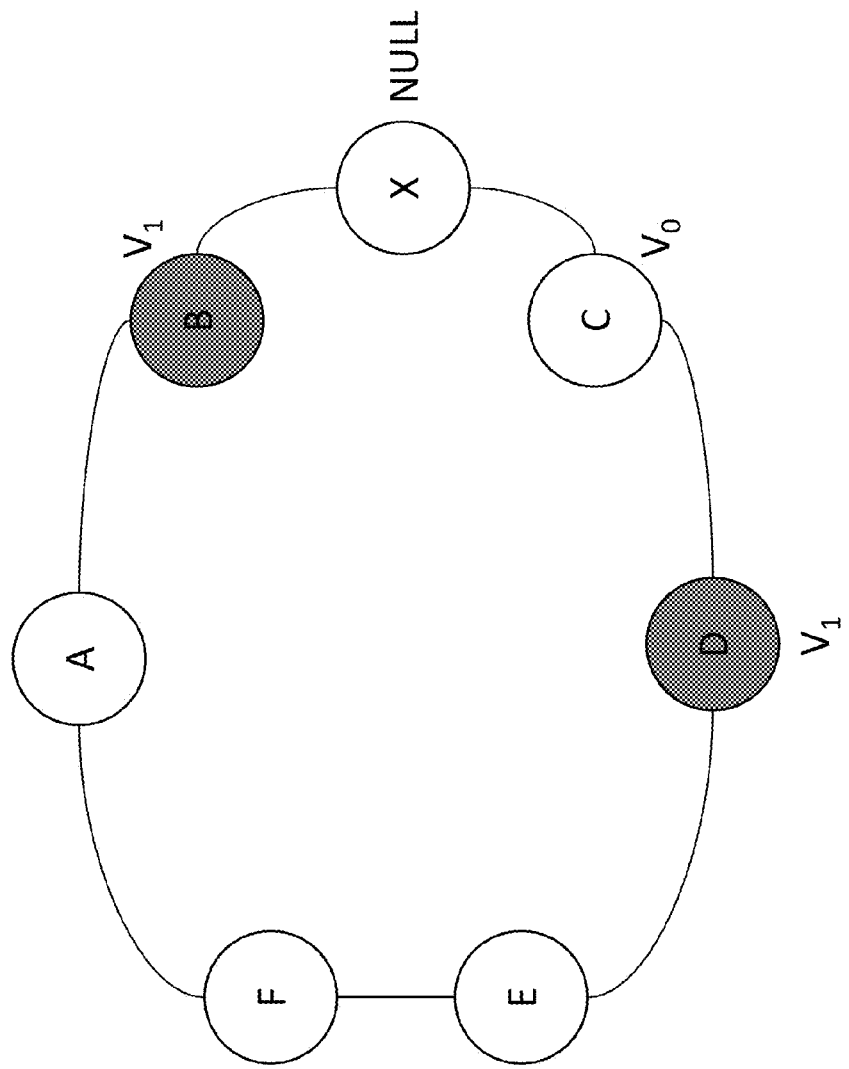
Figure 7D:
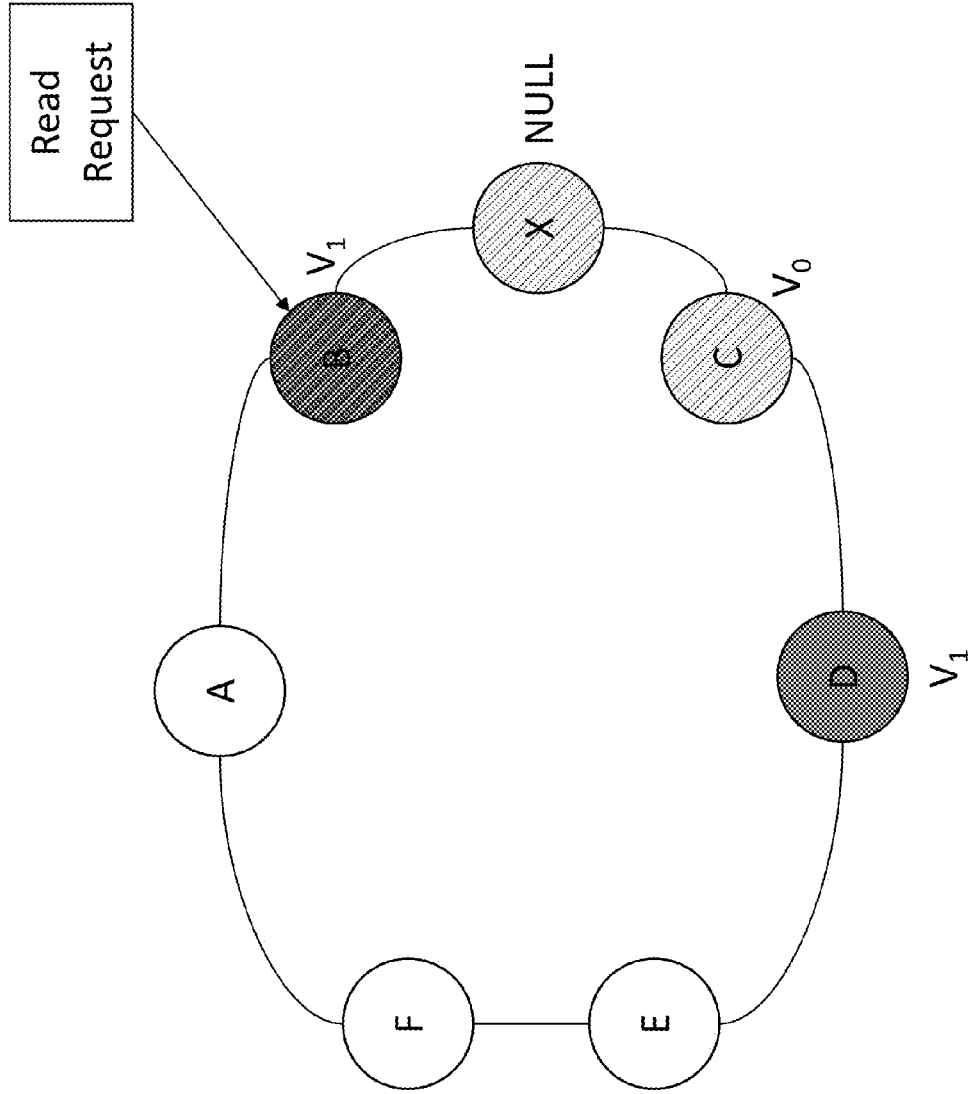

After the write operation has successfully executed, a new node X is introduced into the ring structure as illustrated in FIGS. 7b and 7c. The new node X is inserted between nodes B and C and is initially assigned a metadata value of NULL until a background process updates the new node X with the most up to date metadata value.

Subsequent to the new node X being introduced into the ring structure, but prior to the new node X having its metadata value updated to reflect the most up to date metadata value, a read operation is requested by a service VM using a key, where the hashing algorithm applied to the key identifies node B as the node on which the read operation is to be performed. Because the replication factor remains 3, the next 2 nodes immediately following node B in the ring structure are identified as replica nodes to also be used for the read operation. The next two nodes are nodes X and C rather than nodes C and D, since node X has now been introduced between nodes B and C. Thus, the three nodes forming the set of nodes to be used in performing the read operation are nodes B, X and C, depicted by the dotted pattern in FIG. 7d. Of the three nodes forming the set to be used in performing the read operation, only node B has the most up to date metadata value $V_1$. Node X still has a NULL value as the most up to date metadata values have not yet been updated for that node and node C has an earlier dated metadata value $V_0$ because node C was not used to establish a quorum for the previous write operation.

A quorum must then be established amongst the set of nodes (B and C) for the read operation to be successfully executed. Because the replication factor remains 3, the total set of nodes used to establish a quorum is 3 and the quorum is 2 (i.e., 3/2+1). Thus, two nodes of the set (B, C, and X) must agree on the metadata value that is to be read prior to the read operation being successfully executed.

If nodes B and X or nodes B and C are used to establish a quorum, the most up to date metadata value will be returned. This is because node B has the most up to date metadata value, and as such either node X or node C will automatically recognize that and update its metadata value with the metadata value stored at node B. Thus, node X or node C will automatically recognize that it must update its metadata value with the most up to date metadata value stored on node B. Once node X or node C updates its metadata value with the most up to date metadata value stored on node B, then a quorum may be established using nodes B and X or nodes B and C, and the read operation may be successfully executed.

Figure 7E:
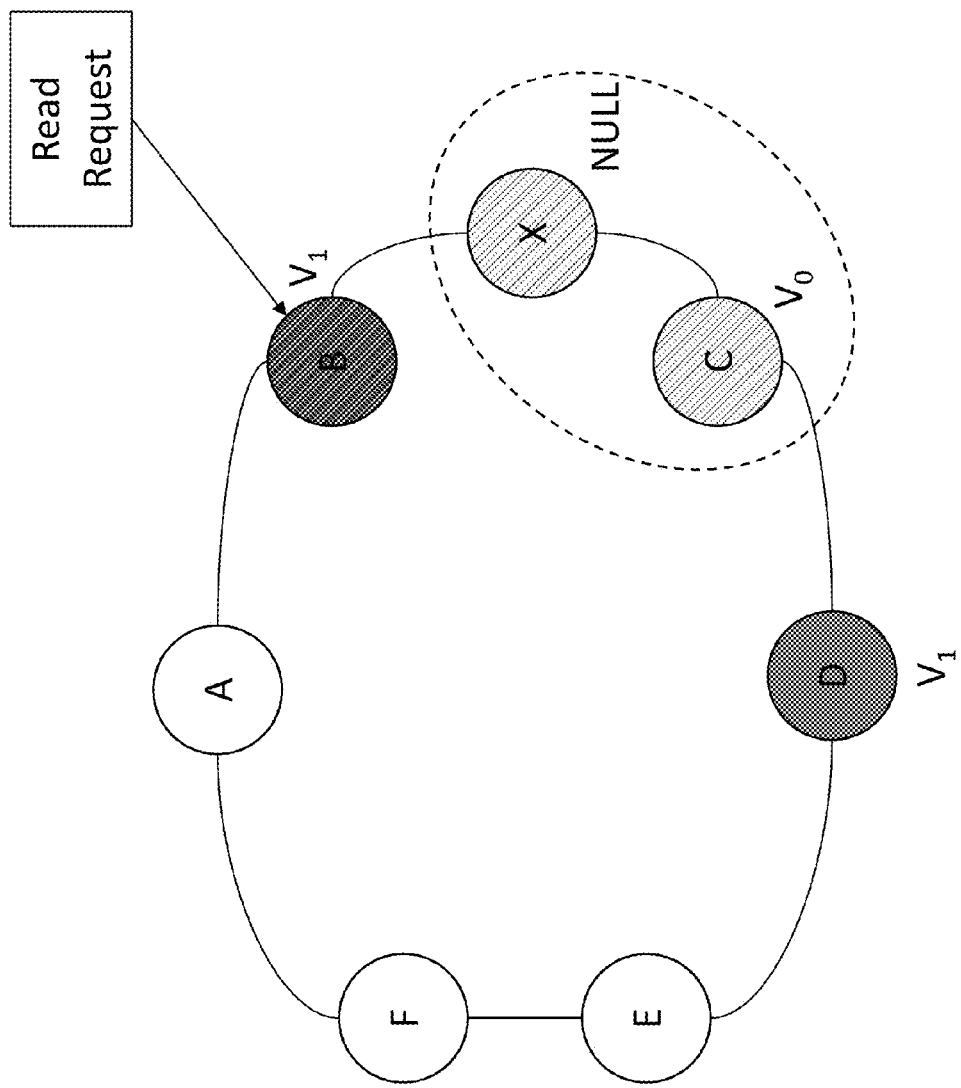

However, if nodes X and C are used to establish a quorum, then the most up to date metadata value will not be returned to the requesting user VM. This is illustrated in FIG. 7e. Between node X and node C, node C has the later dated metadata value $V_0$. As such, node X will automatically recognize that and update its metadata value with the later dated metadata value stored on node C. Once node X updates its metadata value with the later dated metadata value stored on C, a quorum is established between node X and node C, and the later dated metadata value $V_0$ is returned for the read operation. However, the later dated metadata value $V_0$ stored on node C and updated for node X is not the most up to date metadata value $V_1$. Instead, the most up to date metadata value $V_1$ resides on node B. Because node B is not used to establish quorum, for whatever reason (e.g., node B is down), node C and node X will not recognize that there exists a more up to date metadata value $V_1$ than the dated metadata value $V_0$ stored on node C and hence will not return the most up to date metadata value $V_1$ for the read operation.

When a new node is introduced into the ring structure at a time between a completed write operation and a subsequent read operation before the new node has been updated with the most up to date metadata values, a quorum may be established that results in a metadata value being returned for the read operation that is not the most up to date metadata value. This occurs when the set of nodes being used to establish a quorum does not include a node with the most up to date metadata value.

In order to ensure that the most up to date metadata value is returned for a read operation when a new node is introduced into the ring structure at a time between a completed write operation and the read operation, the new node is first placed into a LIMBO state. The LIMBO state is a transition state that provides an indication that a new node has not yet be updated with the latest metadata value. The replication factor is then increased by one upon recognition of a node within the set of nodes on which the read operation is to be performed being in the LIMBO state. This will be discussed in more detail with reference to the flowchart in FIG. 8 and the schematic diagrams of FIGS. 9a-g.

FIG. 8 is a flow diagram illustrating a method for ensuring the return of the most up to date metadata values for a read operation for metadata when a new node is introduced into the ring structure at a time between a completed write operation for the metadata and the read operation for the metadata before the new node has been updated with the most up to date metadata values.

Initially, a new node is introduced at a position following the first node identified for a write I/O operation on metadata, such that the new node may be recognized as a replica node for a subsequent read operation to be performed on the first node as shown at 801.

Prior to the new node being updated with the most up to date metadata values, the new node is placed in a LIMBO state as shown at 803. Placing the new node into a LIMBO state allows the system to recognize that using the current replication factor for establishing quorum for the read operation may lead to a metadata value other than the most up to date metadata value being returned in response to the read operation.

A request may then be received for performing a read operation on the first node identified for the previous write operation while the new node is still in a LIMBO state as shown at 805. A hashing algorithm may be applied to a key associated with the read request to identify the first node for the previous write operation.

Using the current replication factor, a set of nodes on which to perform the read operation is determined as shown at 807. The set of nodes on which to perform the read operation determined using the replication factor includes the new node because the new node is inserted following the first node in the ring structure, such that the new node may be recognized as a replica node for a subsequent read operation to be performed on the first node. Because the new node is still in the LIMBO mode and has not had its metadata values updated with the most up to date metadata values, a quorum may potentially be established using the current replication factor that returns a metadata value that is not the most up to date metadata value as illustrated earlier in FIGS. 7a-d.

Once the system identifies that the set of nodes on which to perform the read operation includes the new node in a LIMBO state, the system increases the replication factor by one to establish a new set of nodes on which to perform the read operation as shown at 809. When the previous replication factor is 3, the new replication factor becomes 4, the new set of nodes becomes 4 (first node plus 3 replica nodes) and the new quorum becomes 3 (i.e., 4/2+1). By increasing the replication factor by one, any set of nodes used to establish the quorum will include at least one node that has the most up to date metadata value. The other nodes of the set used to establish quorum can then update their metadata values to reflect the most up to date metadata values. Quorum may then be established amongst the new set of nodes and the read operation may be successfully completed as shown at 811.

While the new node is in the LIMBO state, a background process may update metadata values for the new node in the LIMBO state. Once the new node has had all of its metadata values updated, the new node may update its state to a normal operating state, and the replication factor may revert to its original value (e.g., from replication factor of 4 to replication factor of 3).

FIGS. 9a-g are schematic diagrams illustrating this method for ensuring the return of the most up to date metadata values for a read operation for metadata when a new node is introduced into the ring structure at a time between a completed write operation for the metadata and the read operation for the metadata before the new node has been updated with the most up to date metadata values. For purposes of example, FIGS. 9a-g follow from the examples shown above in FIG. 4a and FIGS. 7b and c.

Figure 9A:
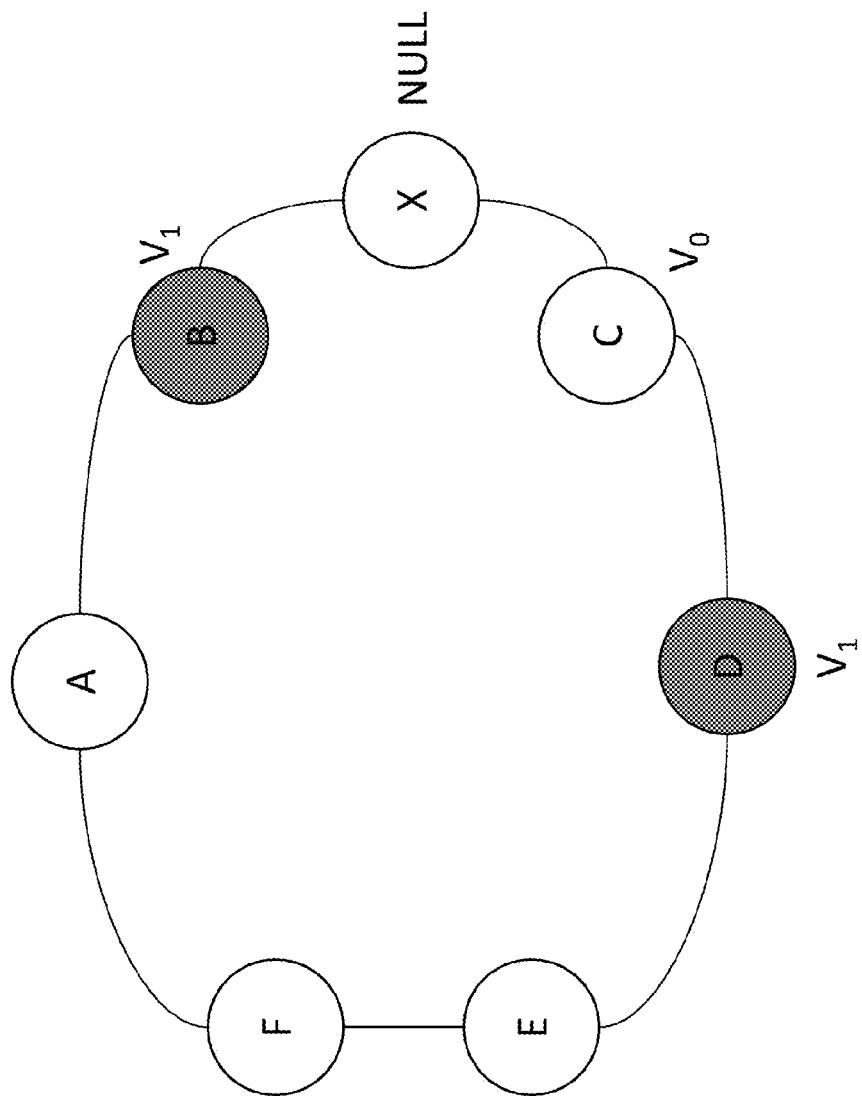
Figure 9C:
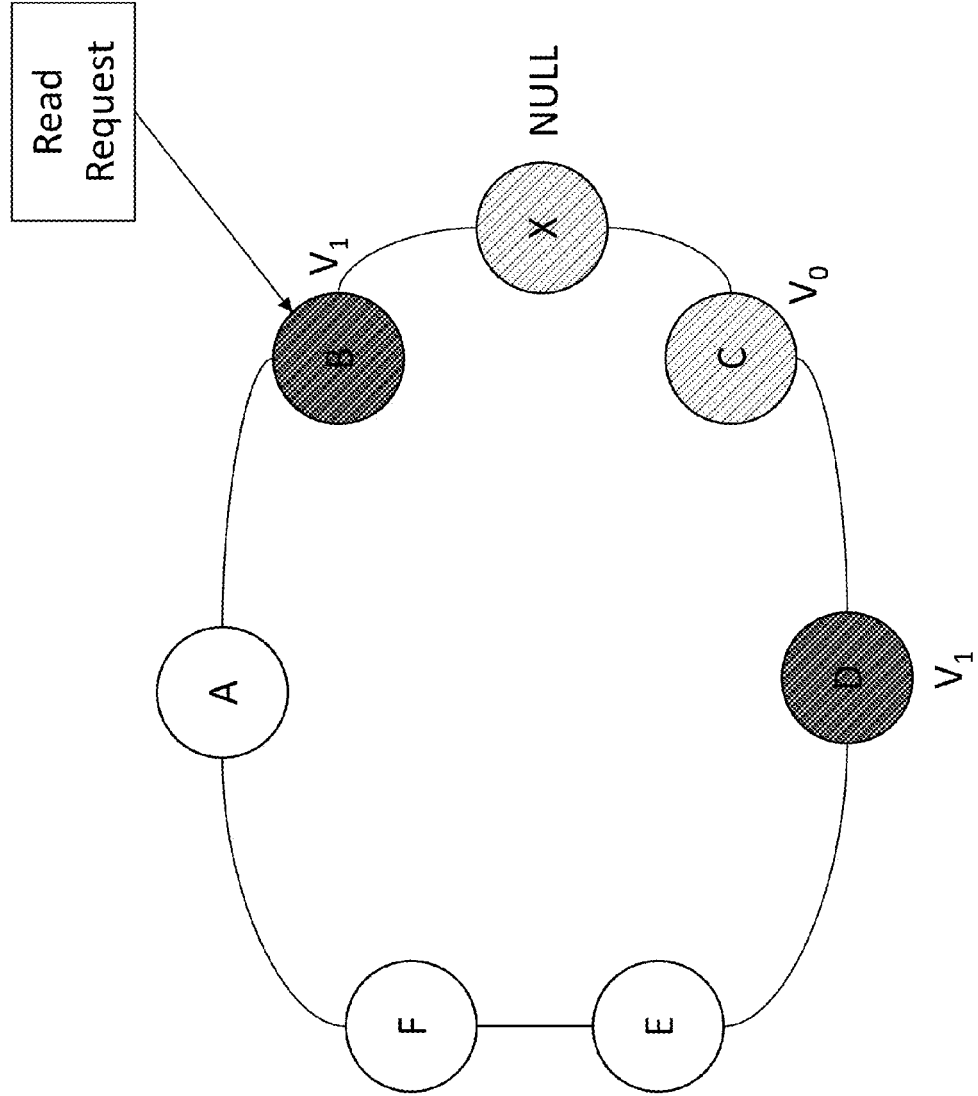

FIG. 9a illustrates the configuration of nodes in the ring structure after quorum has been established for successfully executing a write operation and a new node X has been introduced into the ring structure. In FIG. 9a, quorum was established for the write operation amongst the set of nodes B, C and D. Node B and Node D successfully wrote the metadata value $V_1$ requested in the write operation while node C failed to successfully write the metadata value $V_1$ requested in the write operation. As such, nodes B and D have the most up to date metadata value $V_1$ while node C has an earlier dated metadata value $V_0$. After the write operation was successfully executed, a new node X was introduced into the ring structure between nodes B and C. The new node has not yet had its metadata value updated to reflect the most up to date metadata value and so it is placed into a LIMBO state.

A read operation is then requested on node B as shown in FIG. 9b. The current replication factor is 3 and so the set of nodes used to perform the read operation using that replication factor includes node B as well as replica nodes X and C.

Using the current replication factor (e.g., 3) and set of nodes (e.g., B, X and C) for performing the read operation may potentially result in the metadata value being returned for the read operation not being the most up to date metadata value. This is because the set of nodes for establishing quorum using this replication factor may not have the most up to date metadata value $V_1$. That situation was described earlier with respect to FIG. 7e.

Figure 9D:
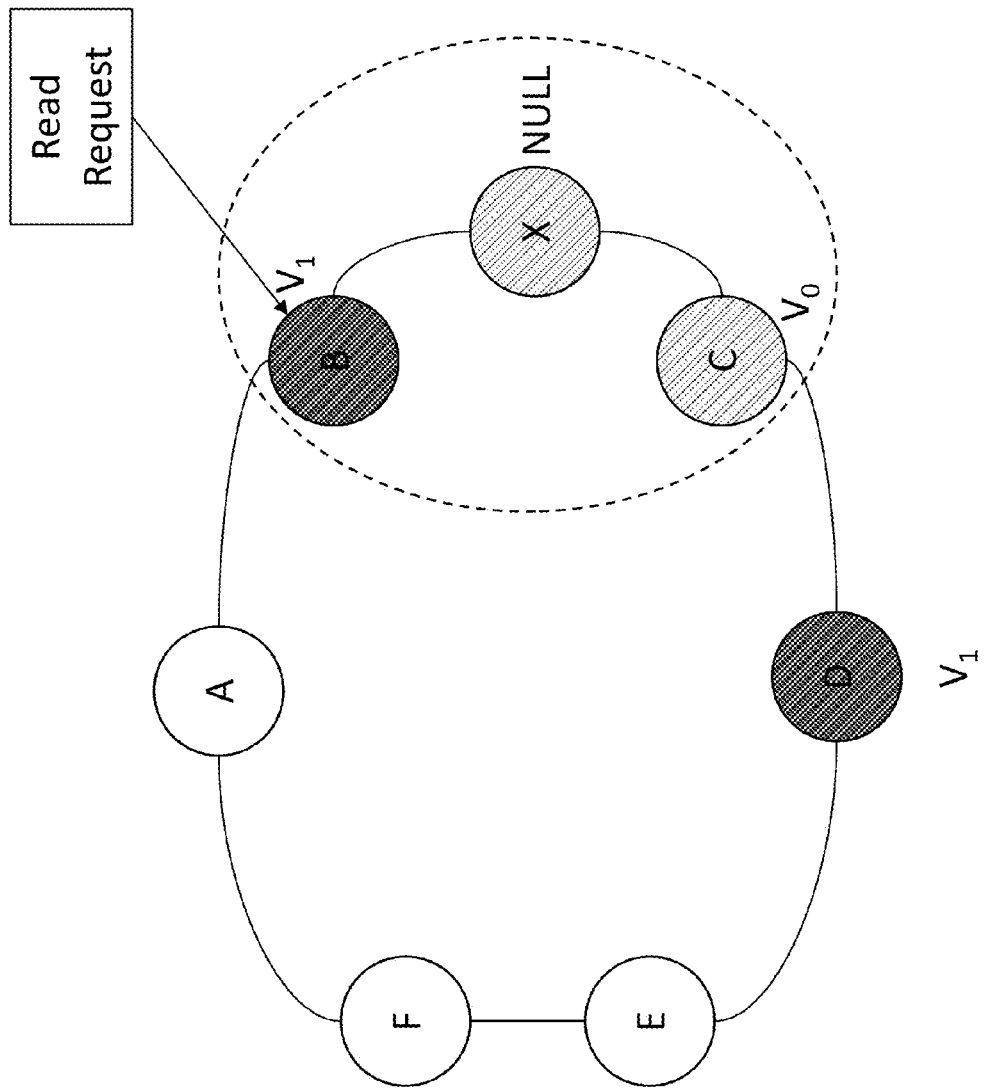
Figure 9G:
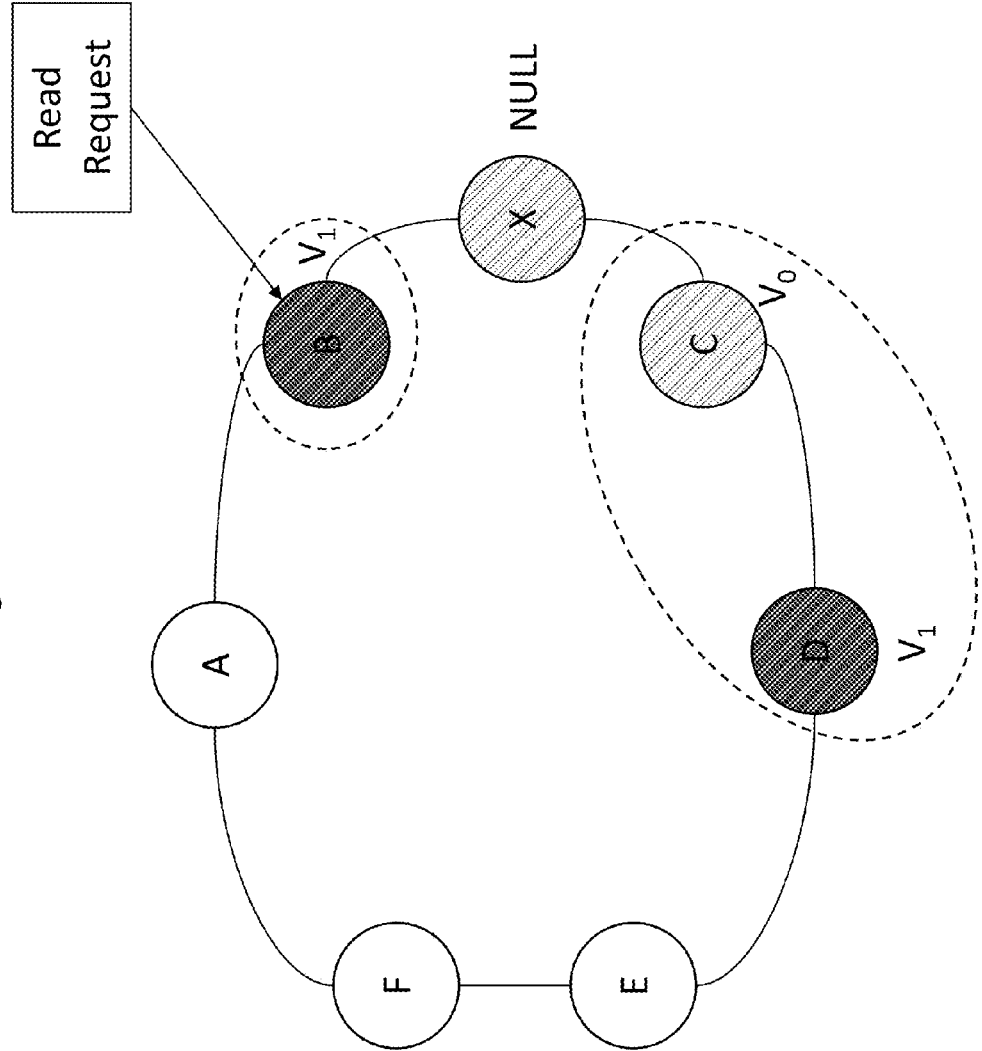

Thus, upon recognition that one of the nodes in the set of nodes is a new node in a LIMBO state, the system increases the replication factor by one. The new replication factor becomes 4, the new set of nodes becomes 4 (first node plus 3 replica nodes) and the new quorum becomes 3 (i.e., 4/2+1). Thus, the new set of nodes on which a read operation is to be performed includes nodes B, X, C and D. Any subset of these nodes used to establish quorum will necessarily include the most up to date metadata value. For example, when nodes B, X and C are used to establish quorum, node B will have the most up to date metadata value $V_1$, as illustrated in FIG. 9d. When nodes X, C and D are used to establish quorum, node D will have the most up to date metadata value $V_1$, as illustrated in FIG. 9e. When nodes B, X and D are used to establish quorum, nodes B and D will have the most up to date metadata value $V_1$, as illustrated in FIG. 9f. When nodes B, C and D are used to establish quorum, nodes B and D will have the most up to date metadata value $V_1$, as illustrated in FIG. 9g.

Thus when any subset of nodes of the new set of nodes are used to establish quorum, the node(s) in the subset not having the most up to date metadata values will automatically recognize that at least one other node in the set has the most up to date metadata value and will update its metadata value to reflect the most up to date metadata value. Quorum is then established between the subset of nodes and the most up to date metadata value is returned for the read operation.

By increasing the replication factor by one upon detection of a LIMBO state for any node within a set of nodes initially determined for the read operation using the replication factor, any subset of the new set of nodes used to establish the quorum will include at least one node that has the most up to date metadata value. The other nodes of the set used to establish quorum can then update their metadata values to reflect the most up to date metadata values. As such, the most up to date metadata value may be returned for a read operation when a new node is introduced into the ring structure at a time between a completed write operation and the read operation.

As mentioned above, while the new node is in the LIMBO state, a background process may update metadata values for the new node in the LIMBO state. Once the new node has had all of its metadata values updated, the new node may update its state to a normal operating state, and the replication factor may revert back to its original value (e.g., from replication factor of 4 to replication factor of 3).

In addition to issues associated with introducing a new node described above, when a new node is introduced into the ring structure at a time between a completed write operation and a subsequent write operation that attempts to write a new metadata value with the same version information as the most up to date metadata value before the new node has been updated with the most up to date metadata values, issues may arise. Such issues may arise in the following context.

A write operation first identifies a set of nodes (first node and replica nodes) on which metadata is to be written and quorum is established amongst that set of nodes for successfully executing the write operation. Subsequently, a new node is introduced at a position immediately following the first node identified for the write I/O operation, such that the new node may be recognized as a replica node for a subsequent write operation on the first node, and thus may participate in establishing a quorum for the subsequent write operation. Before the new node has been updated with the most up to date metadata values by a background process, any subsequent write operation on the first node attempting to write a new metadata value with the same version information as the most up to date data value that identifies the new node as part of the set of nodes for performing the subsequent write operation may potentially result in quorum being established that allows the new metadata value with same version information as the most up to date metadata value to be written and committed. This leads to inconsistency as to what the most up to date metadata value is for the system. This problem is illustrated in FIGS. 10a-e.

FIGS. 10a-e are schematic diagrams illustrating a problem that arises when a new node is introduced into the ring structure at a time between a completed write operation for metadata and a subsequent write operation attempting to write a new metadata value with the same version information as the most up to date data value before the new node has been updated with the most up to date metadata values. For purposes of example, FIGS. 10a-e will be described with reference to the successfully completed write operation of FIG. 4c. However, one ordinarily skilled in the art will recognize that the problem may arise for other node configurations associated with successfully completed write operations where a new node is introduced into the ring structure at a time between a completed write operation and a subsequent write operation attempting to write a new metadata value with the same version information as the most up to date data value before the new node has been updated with the most up to date metadata values.

Figure 10A:
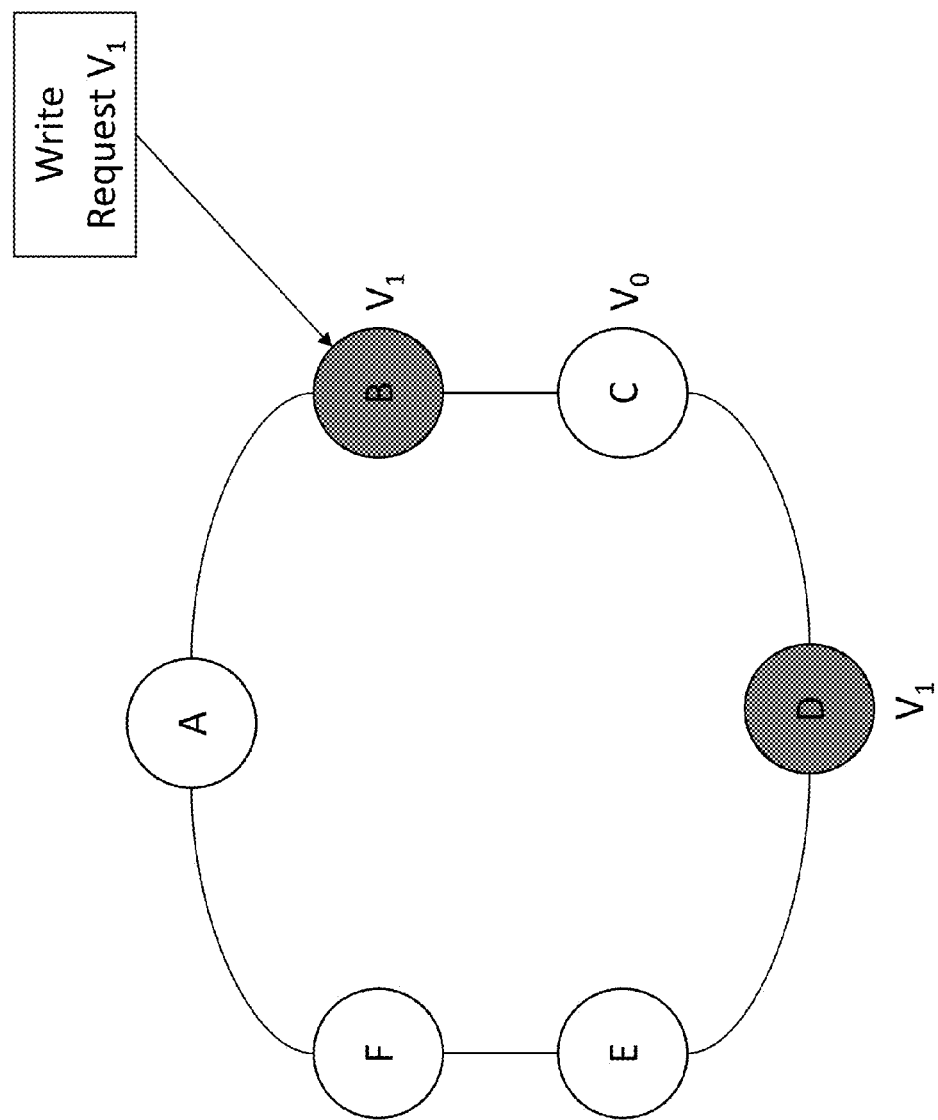
FIGS. 10a-e are schematic diagrams illustrating a problem that arises when a new node is introduced into the ring structure at a time between a completed write operation for metadata and a subsequent write operation attempting to write a new metadata value with the same version information as the most up to date data value before the new node has been updated with the most up to date metadata values.

FIG. 10a illustrates the configuration of nodes in the ring structure after quorum has been established for successfully executing a write operation. In FIG. 7a, quorum was established for the write operation amongst the set of nodes B, C and D. Node B and Node D successfully wrote the metadata value $V_1$ requested in the write operation while node C failed to successfully write the metadata value $V_1$ requested in the write operation. Thus, nodes B and D have the most up to date metadata value $V_1$, while node C has an earlier dated metadata value $V_0$.

Figure 10B:
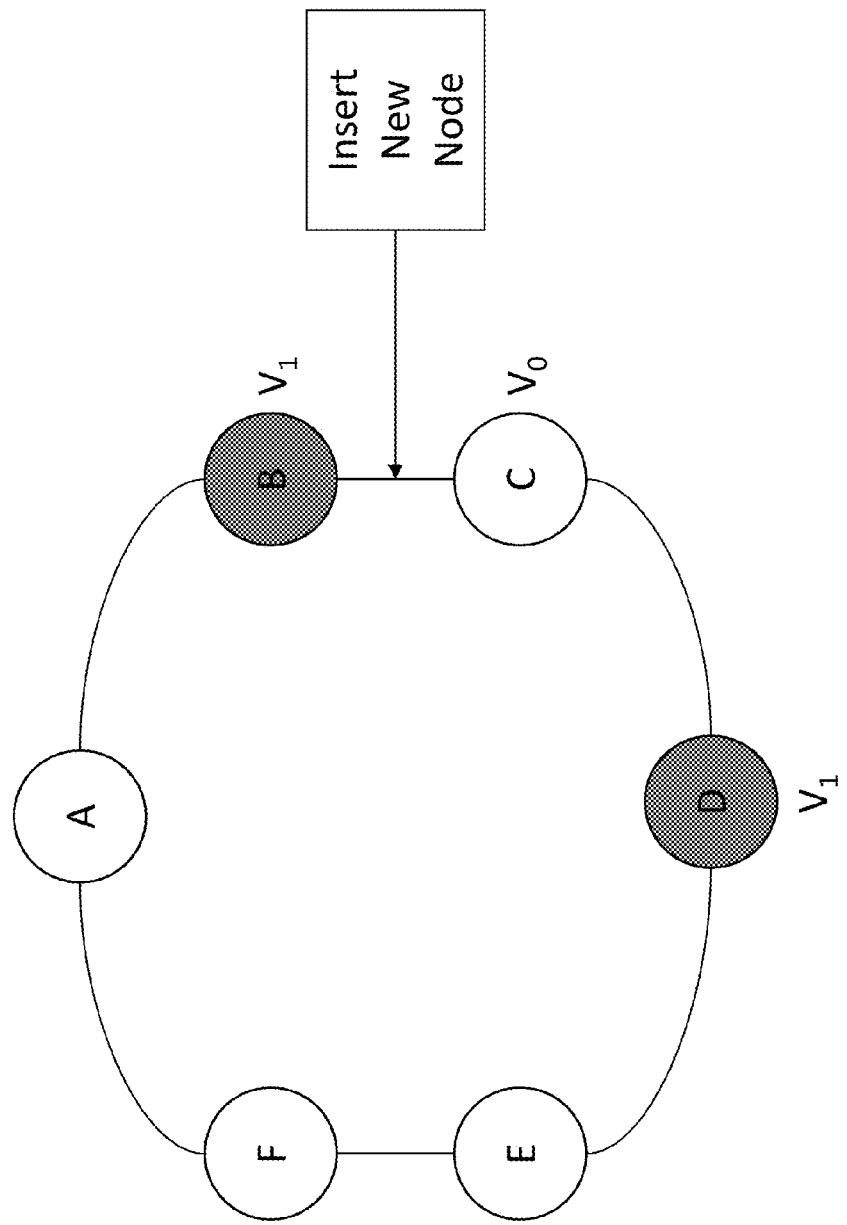
Figure 10C:
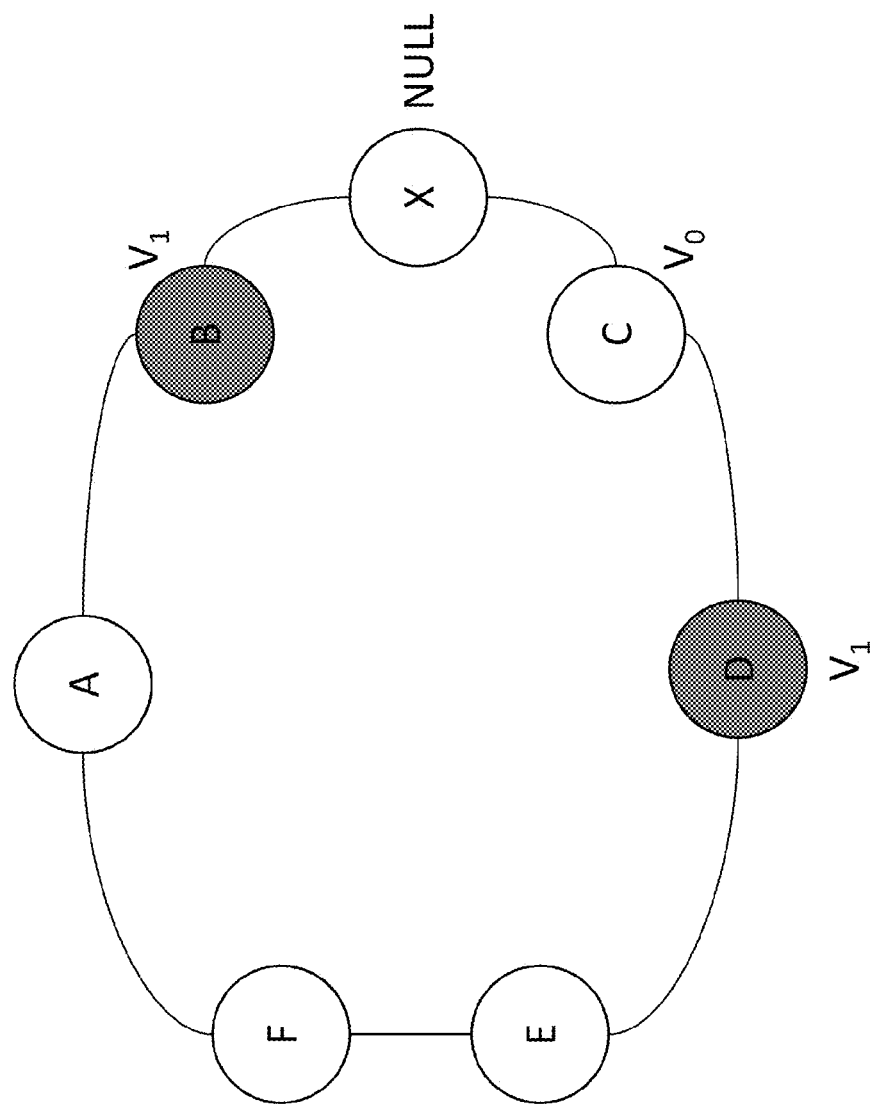
Figure 10D:
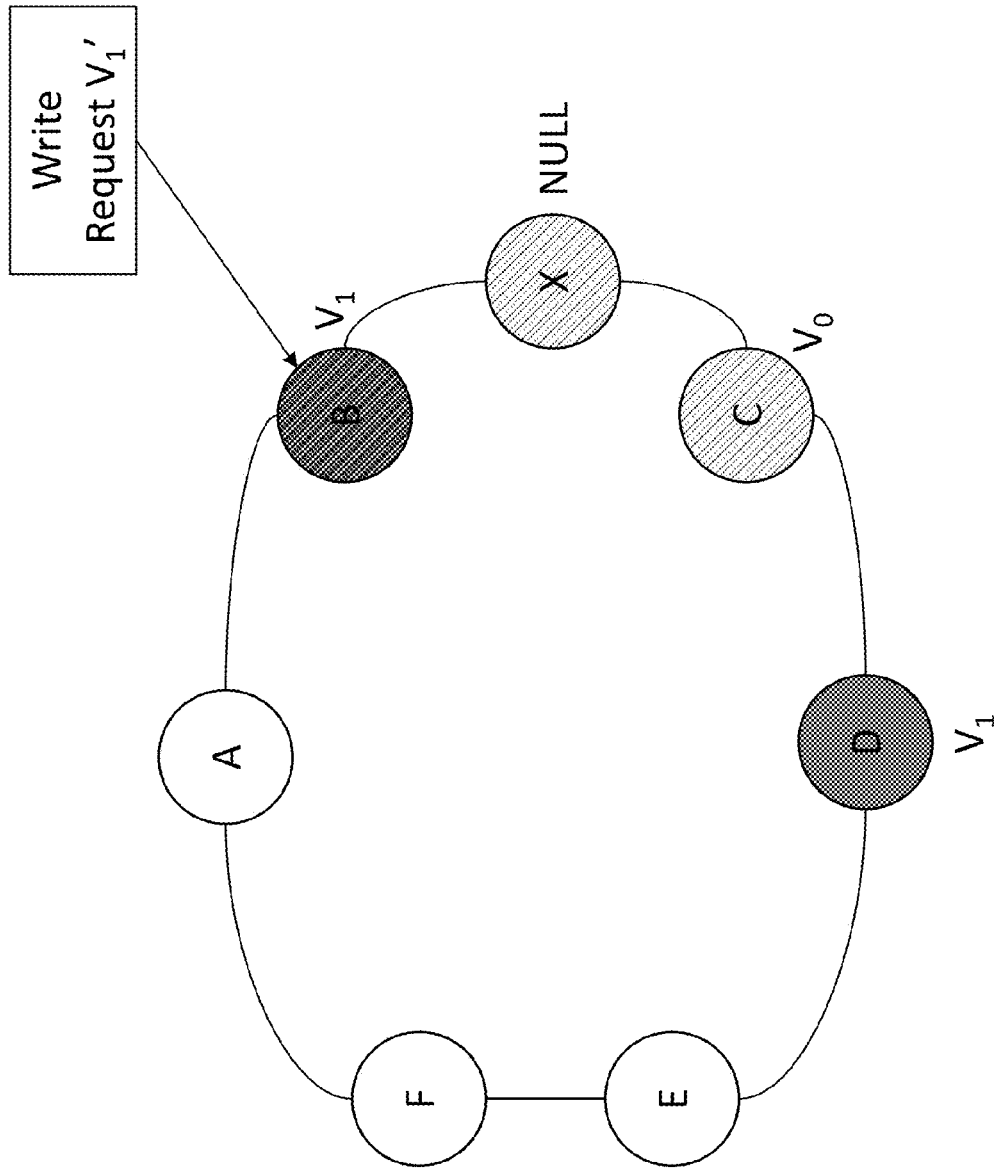

After the write operation has successfully executed, a new node X is introduced into the ring structure as illustrated in FIGS. 10b and 10c. The new node X is inserted between nodes B and C and is initially assigned a metadata value of NULL until a background process updates the new node X with the most up to date metadata value.

Subsequent to the new node X being introduced into the ring structure, but prior to the new node X having its metadata value updated to reflect the most up to date metadata value, a subsequent write operation attempting to write a new metadata value $V_1'$ with the same version information as the most up to date metadata value $V_1$ is requested by a service VM using a key, where the hashing algorithm applied to the key identifies node B as the node on which the subsequent write operation is to be performed. Because the replication factor remains 3, the next 2 nodes immediately following node B in the ring structure are identified as replica nodes to also be used for the subsequent write operation. The next two nodes are nodes X and C rather than nodes C and D, since node X has now been introduced between nodes B and C. Thus, the three nodes forming the set of nodes to be used in performing the subsequent write operation are nodes B, X and C, depicted by the dotted pattern in FIG. 10d. Of the three nodes forming the set to be used in performing the subsequent operation write operation attempting to write a new metadata value $V_1'$ with the same version information as the most up to date data value $V_1$, only node B has the most up to date metadata value $V_1$. Node X still has a NULL value as the most up to date metadata values have not yet been updated for that node and node C has an earlier dated metadata value $V_0$ because node C was not used to establish a quorum for the previous write operation.

A quorum must then be established amongst the set of nodes (B, X and C) for the subsequent write operation to be successfully executed. Because the replication factor remains 3, the total set of nodes used to establish a quorum is 3 and the quorum is 2 (i.e., 3/2+1). Thus, two nodes of the set (B, C, and X) must agree on the metadata value that is to be written prior to the read operation being successfully executed.

If nodes B and X or nodes B and C are used to establish a quorum, the subsequent write operation attempting to write a new metadata value $V_1'$ with the same version information as the most up to date data value $V_1$ will be rejected. This is because node B has the most up to date metadata value $V_1$ with the same version information as the new metadata value $V_1'$, and as such the new metadata value $V_1''$ will not be written because another metadata value with the same version information already exists.

Figure 10E:
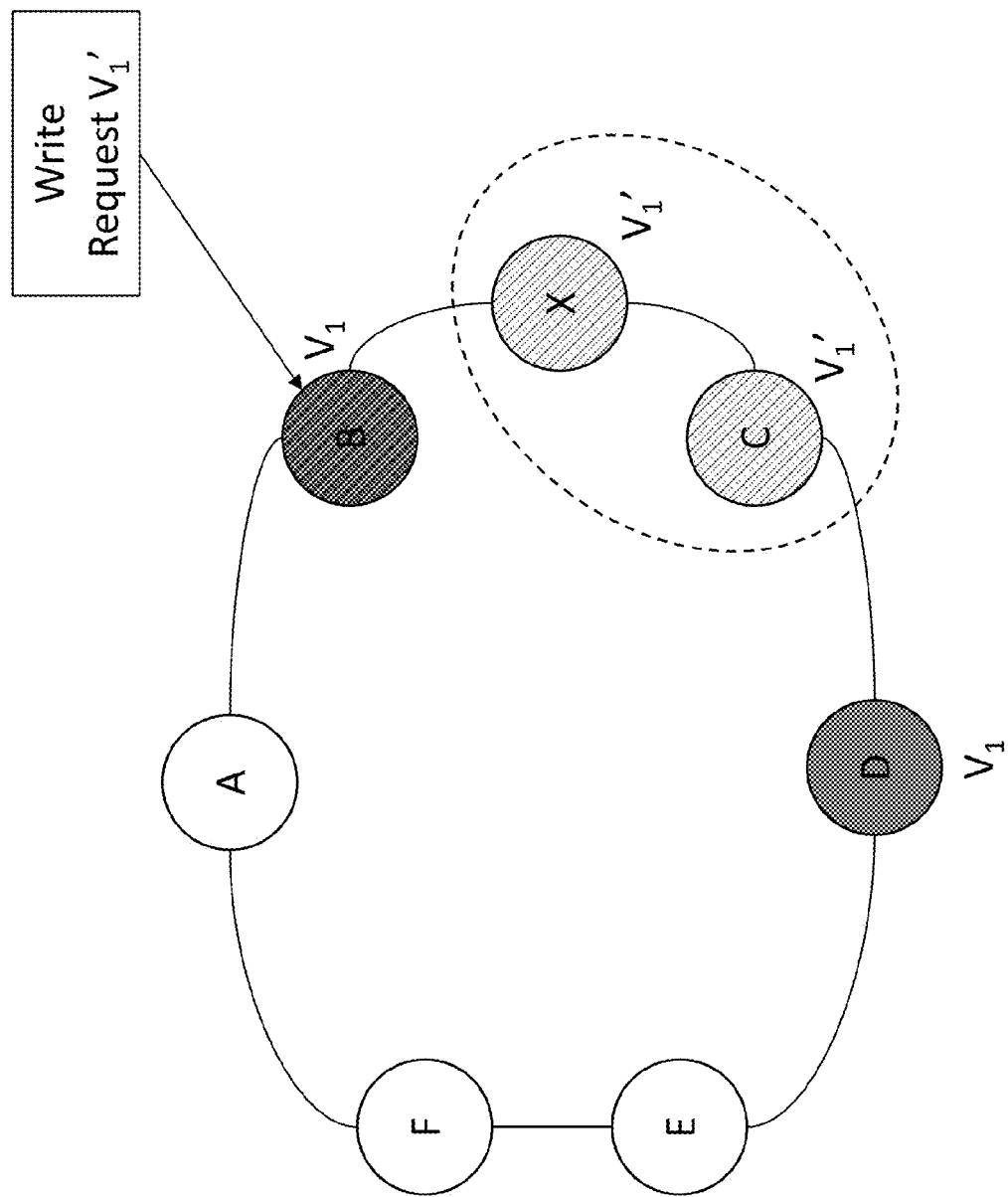

However, if nodes X and C are used to establish a quorum, then the subsequent write operation attempting to write a new metadata value $V_1''$ with the same version information as the most up to date data value $V_1$ will be performed and committed. This is illustrated in FIG. 10e. Neither node X nor node C has a most up to date metadata value with the same version information as the new metadata value $V_1'$. As such, the new metadata value $V_1'$ will be written and committed to both node X and node C because those two nodes are used to establish the quorum, and those two nodes do not include a most up to date metadata value with the same version information as the new metadata value $V_1'$. Because two metadata values $V_1$, $V_1'$ with the same version information exist within the ring structure, inconsistency exists as to what the most up to date metadata value is for the system.

When a new node is introduced into the ring structure at a time between a completed write operation and a subsequent write operation attempting to write a new metadata value with the same version information as the most up to date data value before the new node has been updated with the most up to date metadata values, a quorum may be established that results in a new metadata value with the same version information as a most up to date metadata value being written and committed. This occurs when the set of nodes being used to establish a quorum does not include a node with the most up to date metadata value.

In order to ensure that the a new metadata value with the same version information as the most up to date metadata value is not written and committed when a new node is introduced into the ring structure at a time between a completed write operation and the subsequent write operation attempting to write the new metadata value, the new node is first placed into a LIMBO state. The replication factor is then increased by one upon recognition of a node within the set of nodes on which the subsequent write operation is to be performed being in the LIMBO state. This will be discussed in more detail with reference to the flowchart in FIG. 11 and the schematic diagrams of FIGS. 12a-g.

Figure 11:
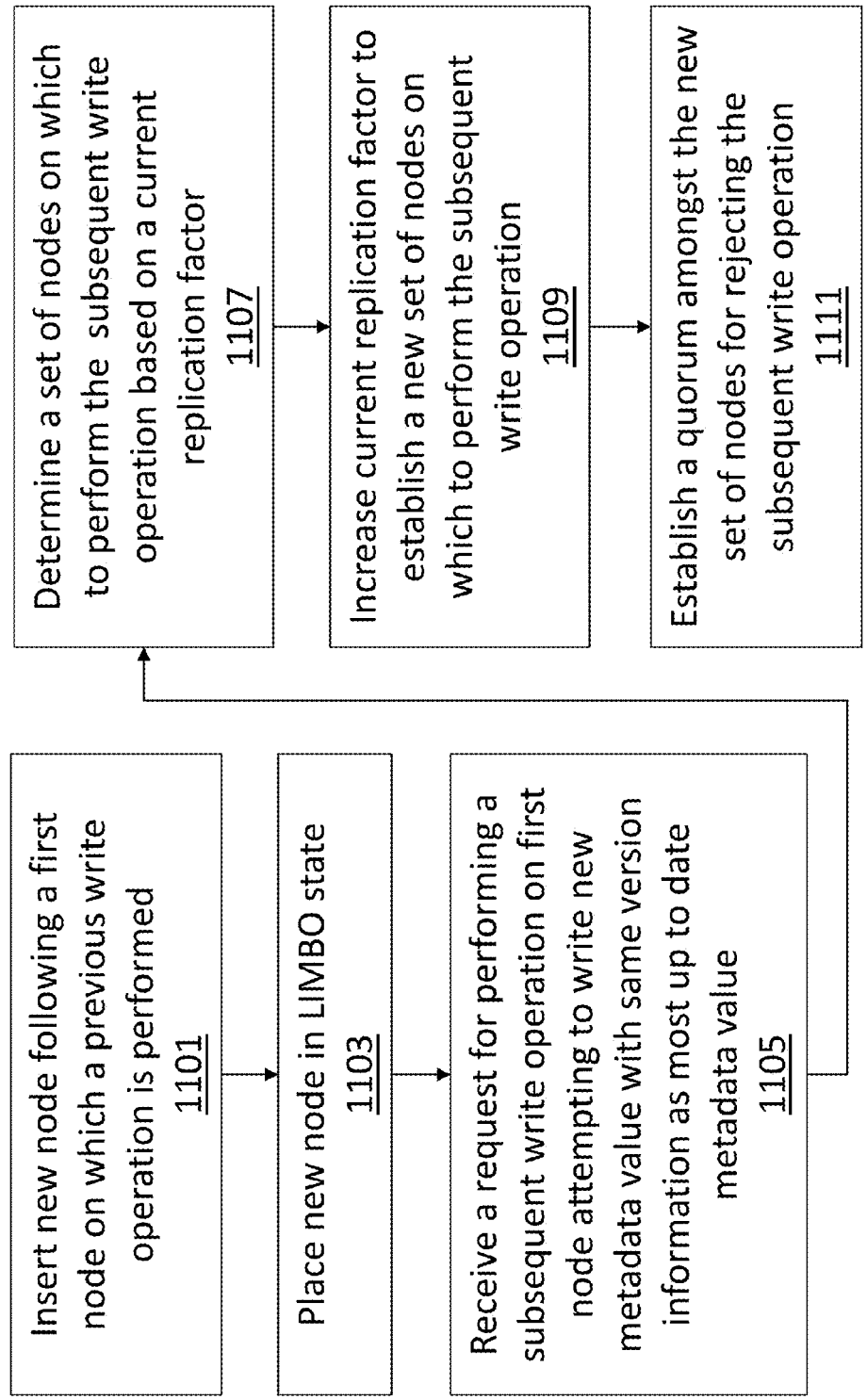
FIG. 11 is a flow diagram illustrating a method for ensuring the rejection of a subsequent write operation attempting to write new metadata with the same version information as the most up to date metadata when a new node is introduced into the ring structure at a time between a completed write operation for the most up to date metadata and the subsequent write operation for the new metadata before the new node has been updated with the most up to date metadata values.

FIG. 11 is a flow diagram illustrating a method for ensuring the rejection of a subsequent write operation attempting to write new metadata with the same version information as the most up to date metadata when a new node is introduced into the ring structure at a time between a completed write operation for the most up to date metadata and the subsequent write operation for the new metadata before the new node has been updated with the most up to date metadata values.

Initially, a new node is introduced at a position following the first node identified for a write I/O operation on metadata, such that the new node may be recognized as a replica node for a subsequent write operation to be performed on the first node as shown at 1101.

Prior to the new node being updated with the most up to date metadata values, the new node is placed in a LIMBO state as shown at 1103. Placing the new node into a LIMBO state allows the system to recognize that using the current replication factor for establishing quorum for the subsequent write operation may lead to a new metadata value having the same version information as the most up to date metadata value being written and committed.

A request may then be received for performing a subsequent write operation attempting to write a new metadata value with the same version information as the most up to date data value on the first node identified for the previous write operation while the new node is still in a LIMBO state as shown at 1105. A hashing algorithm may be applied to a key associated with the subsequent write request to identify the first node for the previous write operation.

Using the current replication factor, a set of nodes on which to perform the subsequent write operation is determined as shown at 1107. The set of nodes on which to perform the subsequent write operation determined using the replication factor includes the new node because the new node is inserted following the first node in the ring structure, such that the new node may be recognized as a replica node for the subsequent write operation to be performed on the first node. Because the new node is still in the LIMBO mode and has not had its metadata values updated with the most up to date metadata values, a quorum may potentially be established using the current replication factor that results in a new metadata value having the same version information as the most up to date data value being written and committed as illustrated earlier in FIGS. 10a-e.

Once the system identifies that the set of nodes on which to perform the subsequent write operation includes the new node in a LIMBO state, the system increases the replication factor by one to establish a new set of nodes on which to perform the subsequent write operation as shown at 1109. When the previous replication factor is 3, the new replication factor becomes 4, the new set of nodes becomes 4 (first node plus 3 replica nodes) and the new quorum becomes 3 (i.e., 4/2+1). By increasing the replication factor by one, any set of nodes used to establish the quorum will include at least one node that has the most up to date metadata value. As such a new metadata value with the same version information as the most up to date data value will be rejected. This is because at least one node used to establish the quorum has the most up to date metadata value with the same version information as the new metadata value, and as such the new metadata value will not be written because another metadata value with the same version information already exists.

The other nodes of the set used to establish quorum can then update their metadata values to reflect the most up to date metadata values. Quorum may then be established amongst the new set of nodes and the subsequent write operation may be rejected as shown at 811.

While the new node is in the LIMBO state, a background process may update metadata values for the new node in the LIMBO state. Once the new node has had all of its metadata values updated, the new node may update its state to a normal operating state, and the replication factor may revert to its original value (e.g., from replication factor of 4 to replication factor of 3).

FIGS. 12a-g are schematic diagrams illustrating this method for ensuring the rejection of a subsequent write operation attempting to write new metadata with the same version information as the most up to date metadata when a new node is introduced into the ring structure at a time between a completed write operation for the most up to date metadata and the subsequent write operation for the new metadata before the new node has been updated with the most up to date metadata values. For purposes of example, FIGS. 9a-g follow from the examples shown above in FIGS. 10a-e.

Figure 12A:
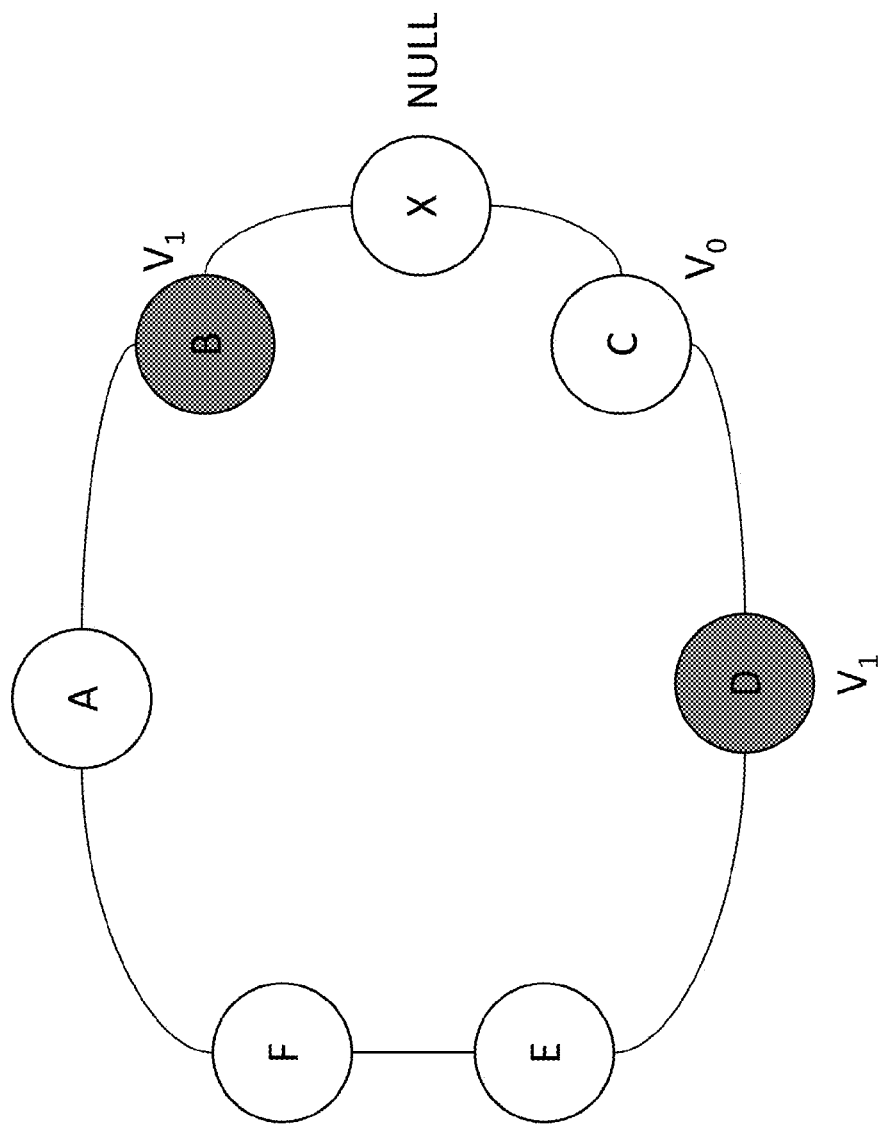

FIG. 12a illustrates the configuration of nodes in the ring structure after quorum has been established for successfully executing a write operation and a new node X has been introduced into the ring structure. In FIG. 12a, quorum was established for the write operation amongst the set of nodes B, C and D. Node B and Node D successfully wrote the metadata value $V_1$ requested in the write operation while node C failed to successfully write the metadata value $V_1$ requested in the write operation. As such, nodes B and D have the most up to date metadata value $V_1$ while node C has an earlier dated metadata value $V_0$. After the write operation was successfully executed, a new node X was introduced into the ring structure between nodes B and C. The new node has not yet had its metadata value updated to reflect the most up to date metadata value and so it is placed into a LIMBO state.

Figure 12B:
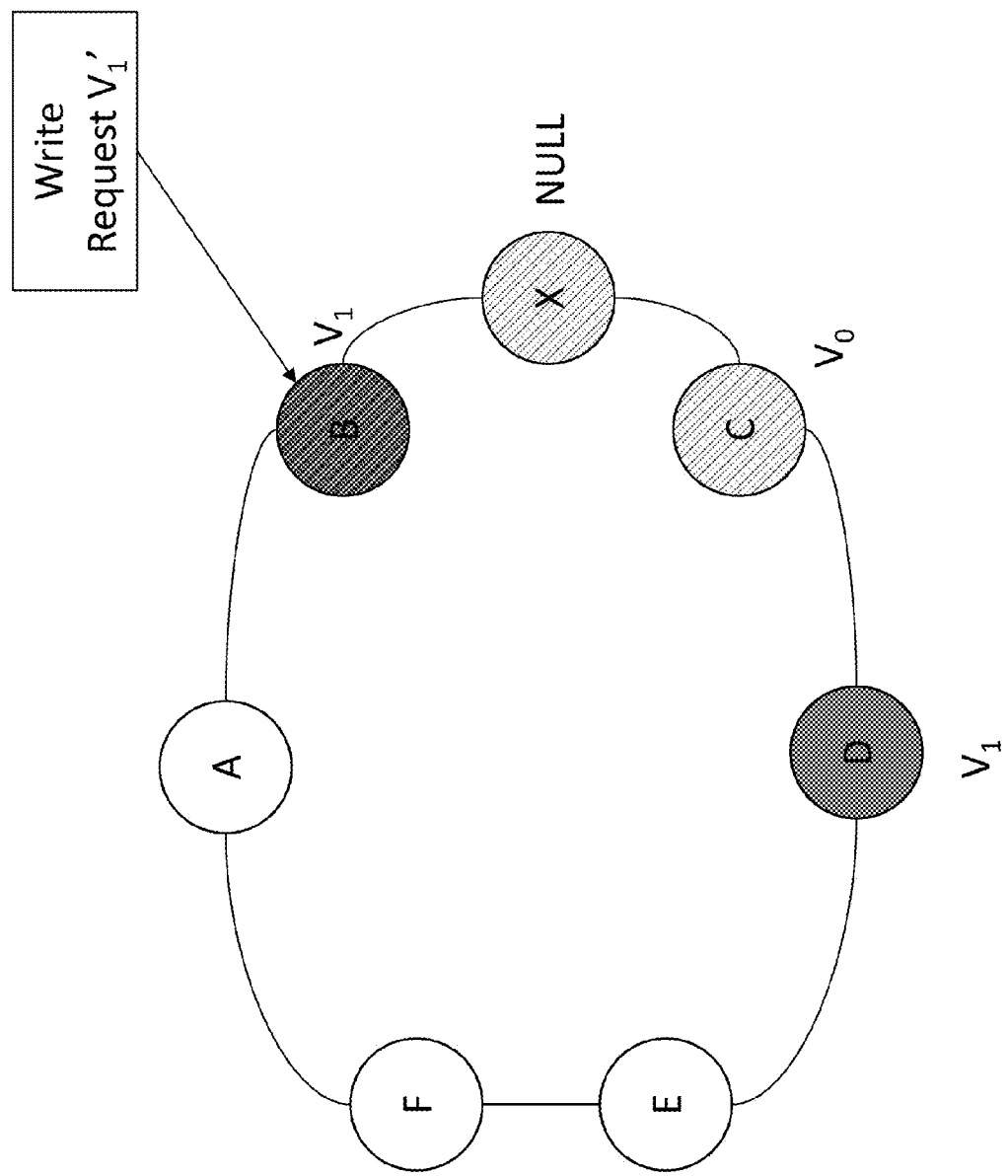

A subsequent write operation attempting to write a new metadata value $V_1'$ with the same version information as the most up to date metadata value $V_1$ is then requested on node B as shown in FIG. 12b. The current replication factor is 3 and so the set of nodes used to perform the subsequent write operation using that replication factor includes node B as well as replica nodes X and C. Using the current replication factor (e.g., 3) and set of nodes (e.g., B, X and C) for performing the subsequent write operation may potentially result in the new metadata value being written and committed. This is because the set of nodes for establishing quorum using this replication factor may not have the most up to date metadata value $V_1$. That situation was described earlier with respect to FIG. 10e.

Figure 12C:
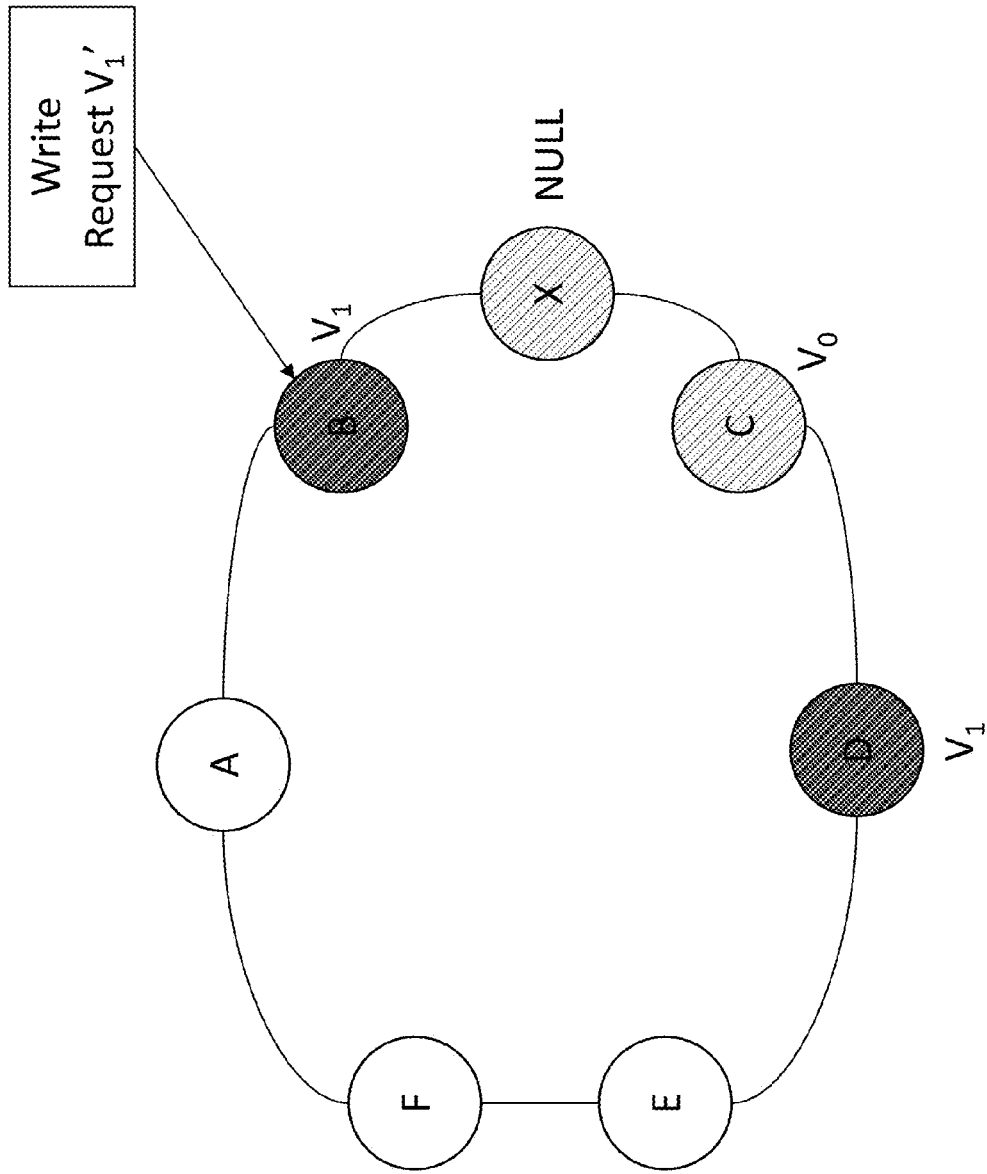
Figure 12D:
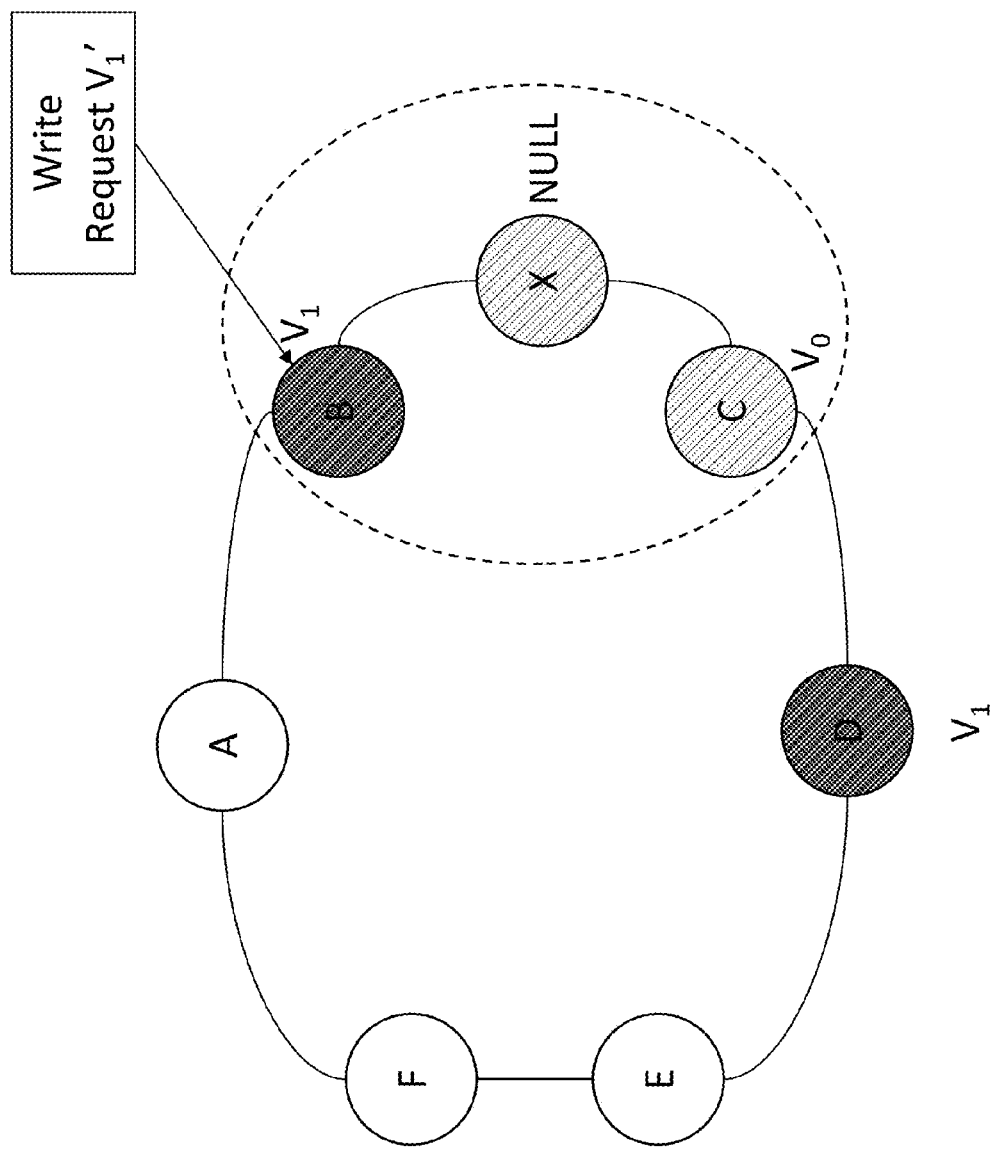
Figure 12E:
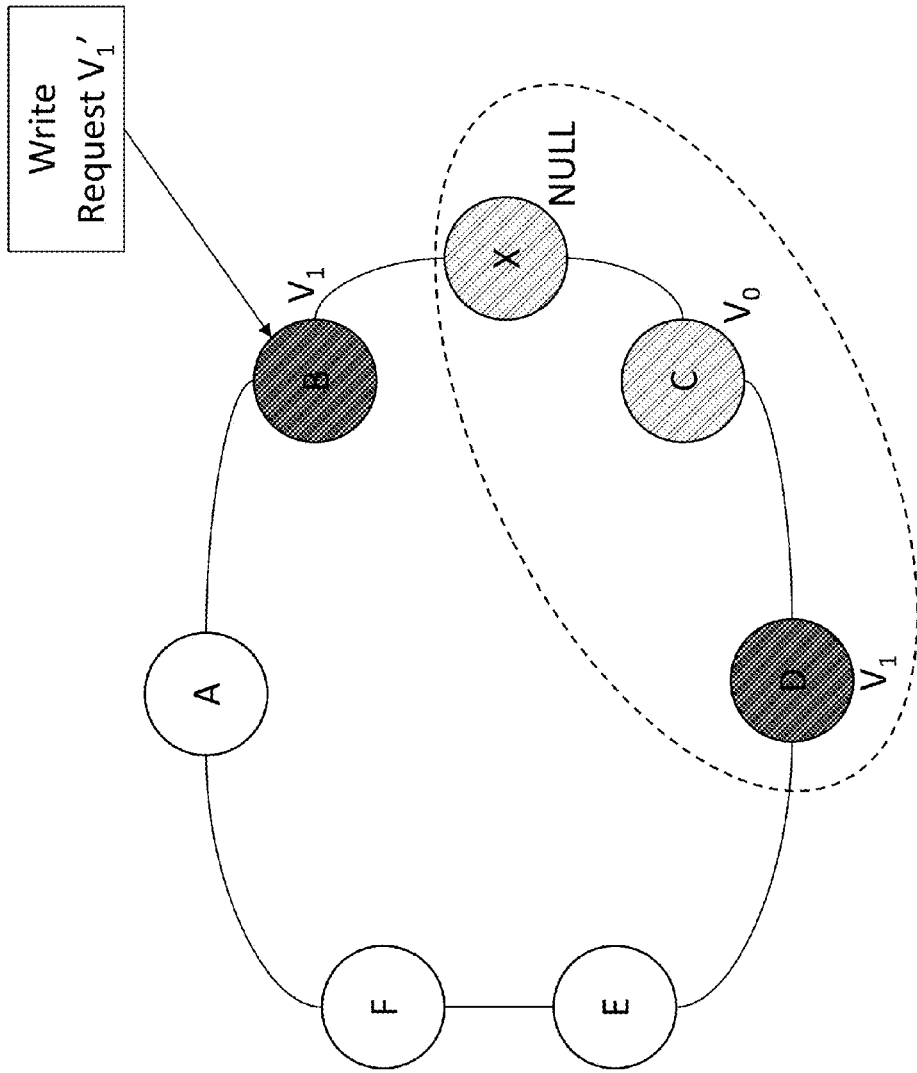
Figure 12G:
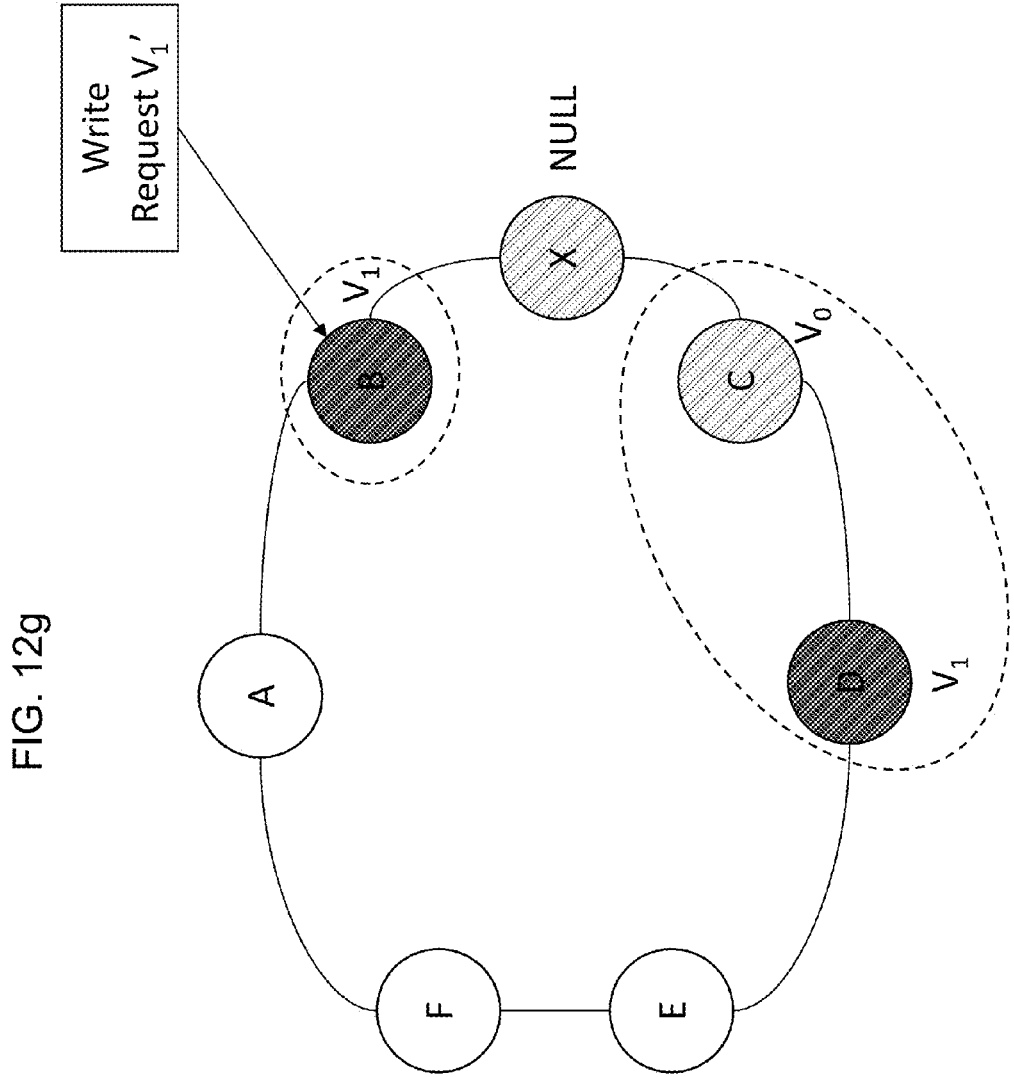

Thus, upon recognition that one of the nodes in the set of nodes is a new node in a LIMBO state, the system increases the replication factor by one. The new replication factor becomes 4, the new set of nodes becomes 4 (first node plus 3 replica nodes) and the new quorum becomes 3 (i.e., 4/2+1). Thus, the new set of nodes on which a subsequent write operation is to be performed includes nodes B, X, C and D as shown in FIG. 12c. Any subset of these nodes used to establish quorum will necessarily include a node with the most up to date metadata value. For example, when nodes B, X and C are used to establish quorum, node B will have the most up to date metadata value $V_1$, as illustrated in FIG. 12d. When nodes X, C and D are used to establish quorum, node D will have the most up to date metadata value $V_1$, as illustrated in FIG. 12e. When nodes B, X and D are used to establish quorum, nodes B and D will have the most up to date metadata value $V_1$, as illustrated in FIG. 12f. When nodes B, C and D are used to establish quorum, nodes B and D will have the most up to date metadata value $V_1$, as illustrated in FIG. 12g.

By increasing the replication factor by one upon detection of a LIMBO state for any node within a set of nodes initially determined for the subsequent write operation using the replication factor, any subset of the new set of nodes used to establish the quorum will include at least one node that has the most up to date metadata value $V_1$. As such the new metadata value $V_1'$ with the same version information as the most up to date data value $V_1$ will be rejected. This is because at least one node used to establish the quorum has the most up to date metadata value $V_1$ with the same version information as the new metadata value $V_1'$, and as such the new metadata value $V_1'$ will not be written because another metadata value with the same version information already exists.

The other nodes of the set used to establish quorum can then update their metadata values to reflect the most up to date metadata values. Quorum may then be established amongst the new set of nodes and the subsequent write operation may be rejected.

As mentioned above, while the new node is in the LIMBO state, a background process may update metadata values for the new node in the LIMBO state. Once the new node has had all of its metadata values updated, the new node may update its state to a normal operating state, and the replication factor may revert to its original value (e.g., from replication factor of 4 to replication factor of 3).

Although the above description has been described with reference to maintaining consistency for I/O operations on metadata data distributed among a plurality of nodes forming a ring structure, it is important to note that the methods and examples described may also be performed to maintain consistency for I/O operation on other types of data distributed among a plurality of nodes forming a ring structure. For example, the methods for maintaining consistency for I/O operations described above may be utilized for data of vDisks stored at nodes forming a ring structure.

System Architecture

Figure 13:
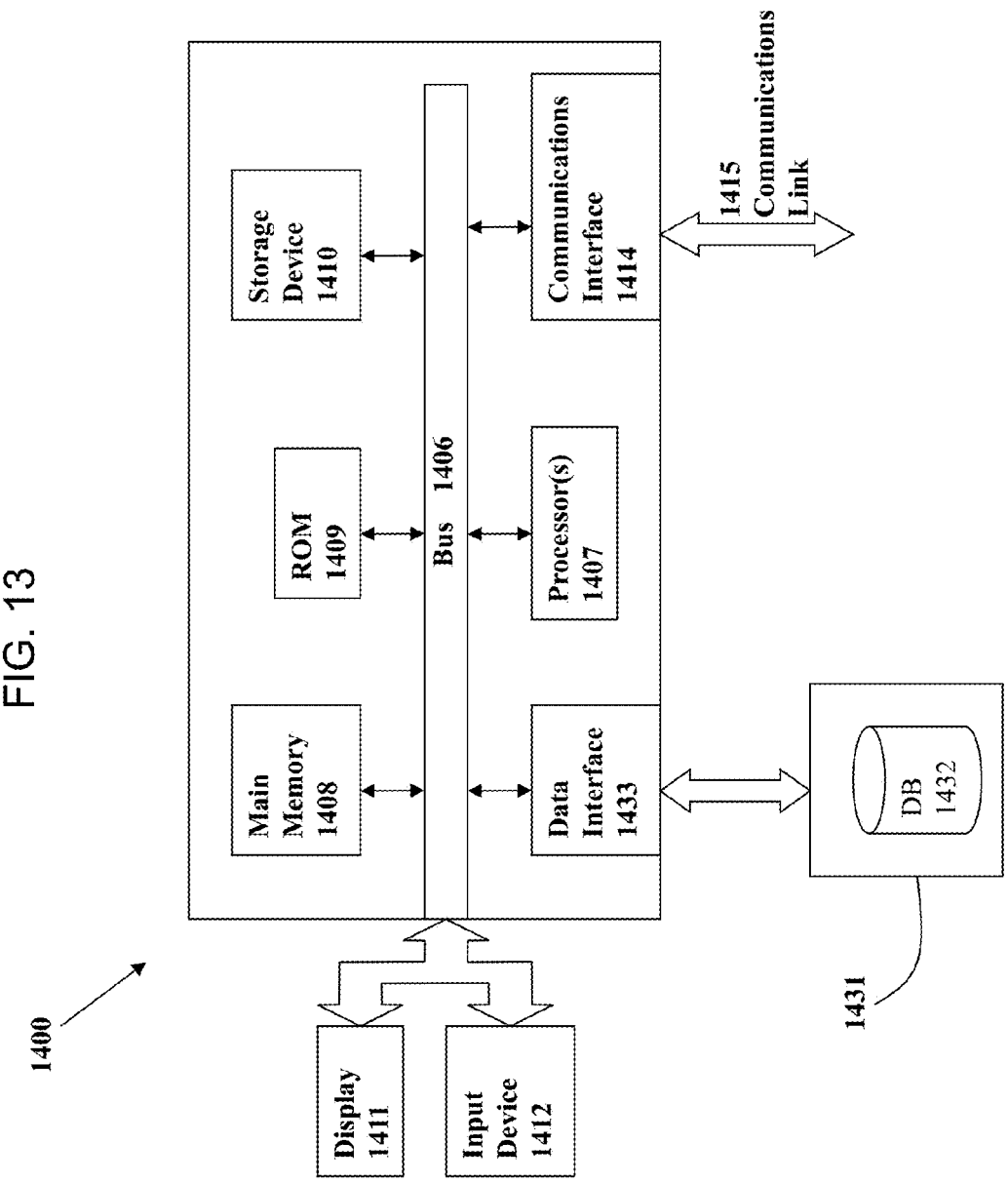
FIG. 13 is a block diagram of an illustrative computing system 1400 suitable for implementing an embodiment of the present invention.

FIG. 13 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH- EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for maintaining consistency for I/O operations on data distributed amongst a plurality of nodes forming a ring structure, comprising:
   introducing a new node into the plurality of nodes forming the ring structure, wherein the new node is introduced at a location following a first node identified for a previous write operation of the data such that the new node may be recognized as a replica node for a subsequent I/O operation to be performed on the first node;
   placing the new node into a transition state while data values for the new node are not up to date;
   receiving a request for performing the subsequent I/O operation on the first node;
   determining a first set of nodes on which to perform the subsequent I/O operation based on a current replication factor;
   increasing the current replication factor to establish a new replication factor upon determination that the first set of nodes on which to perform the subsequent I/O operation includes the new node in the transition state; and
   establishing quorum using a second set of nodes based on the new replication factor.

2. The method of claim 1, wherein the subsequent I/O operation is a read operation.

3. The method of claim 1, wherein the subsequent I/O operation is a write operation attempting to write a new data value with a same version information as a data value written by the previous write operation.

4. The method of claim 1, wherein the new node is introduced at a location immediately following the first node identified for the previous write operation of data.

5. The method of claim 1, wherein the first set of nodes on which to perform the subsequent I/O operation includes at least one node without a most up to date data value.

6. The method of claim 1, wherein the current replication factor is 3 and the new replication factor is 4.

7. The method of claim 6, wherein quorum is 3.

8. The method of claim 1, wherein determining a first set of nodes on which to perform the subsequent I/O operation comprises selecting the first node and one or more nodes immediately following the first node in the ring structure such that a total number of nodes in the first set is equal to the replication factor.

9. The method of claim 1, wherein any subset of the second set of nodes may be selected to establish quorum.

10. The method of claim 9, wherein at least one node of the subset of the second set of nodes includes a most up to date data value.

11. The method of claim 10, wherein establishing quorum comprises updating a data value for a node of the subset not including the most up to date data value using the at least one node of the subset that includes the most up to date data value.

12. The method of claim 1, wherein a background process updates the data values for the new node while the new nodes is in the transition state.

13. The method of claim 12, wherein the new node transitions from the transition state to a normal operating state once the background process completes updating the data values for the new node.

14. The method of claim 13, wherein the new replication factor reverts back to the current replication factor once the new node transitions to the normal operating state.

15. A computer program product comprising a non-transitory computer usable medium having executable code to execute a method for maintaining consistency for I/O operations on data distributed amongst a plurality of nodes forming a ring structure, the method comprising:
   introducing a new node into the plurality of nodes forming the ring structure, wherein the new node is introduced at a location following a first node identified for a previous write operation of the data such that the new node may be recognized as a replica node for a subsequent I/O operation to be performed on the first node;
   placing the new node into a transition state while data values for the new node are not up to date;
   receiving a request for performing the subsequent I/O operation on the first node;
   determining a first set of nodes on which to perform the subsequent I/O operation based on a current replication factor;
   increasing the current replication factor to establish a new replication factor upon determination that the first set of nodes on which to perform the subsequent I/O operation includes the new node in the transition state; and
   establishing quorum using a second set of nodes based on the new replication factor.

16. The computer program product of claim 15, wherein the subsequent I/O operation is a read operation.

17. The computer program product of claim 15, wherein the subsequent I/O operation is a write operation attempting to write a new data value with a same version information as a data value written by the previous write operation.

18. The computer program product of claim 15, wherein the new node is introduced at a location immediately following the first node identified for the previous write operation of data.

19. The computer program product of claim 15, wherein the first set of nodes on which to perform the subsequent I/O operation includes at least one node without a most up to date value.

20. The computer program product of claim 15, wherein the current replication factor is 3 and the new replication factor is 4.

21. The computer program product of claim 20, wherein quorum is 3.

22. The computer program product of claim 15, wherein determining a first set of nodes on which to perform the subsequent read operation comprises selecting the first node and one or more nodes immediately following the first node in the ring structure such that a total number of nodes in the first set is equal to the replication factor.

23. The computer program product of claim 15, wherein any subset of the second set of nodes may be selected to establish quorum.

24. The computer program product of claim 23, wherein at least one node of the subset of the second set of nodes includes a most up to date data value.

25. The computer program product of claim 24, wherein establishing quorum comprises updating a data value for a node of the subset not including the most up to date data value using the at least one node of the subset that includes the most up to date data value.

26. The computer program product of claim 15, wherein a background process updates the data values for the new node while the new nodes is in the transition state.

27. The computer program product of claim 26, wherein the new node transitions from the transition state to a normal operating state once the background process completes updating the data values for the new node.

28. The computer program product of claim 27, wherein the new replication factor reverts back to the current replication factor once the new node transitions to the normal operating state.

29. A system for maintaining consistency for I/O operations on data distributed amongst a plurality of nodes forming a ring structure, comprising:
 a processor for:
  introducing a new node into the plurality of nodes forming the ring structure, wherein the new node is introduced at a location following a first node identified for a previous write operation of the data such that the new node may be recognized as a replica node for a subsequent read operation to be performed on the first node;
  placing the new node into a transition state while data values for the new node are not up to date;
  receiving a request for performing the subsequent read operation on the first node;
  determining a first set of nodes on which to perform the subsequent read operation based on a current replication factor;
  increasing the current replication factor to establish a new replication factor upon determination that the first set of nodes on which to perform the subsequent read operation includes the new node in the transition state; and
  establishing quorum using a second set of nodes based on the new replication factor.

30. The system of claim 29, wherein the subsequent I/O operation is a read operation.

31. The computer program product of claim 29, wherein the subsequent I/O operation is a write operation attempting to write a new data value with a same version information as a data value written by the previous write operation.

32. The system of claim 29, wherein the new node is introduced at a location immediately following the first node identified for the previous write operation of data.

33. The system of claim 29, wherein the first set of nodes on which to perform the subsequent read operation includes at least one node without a most up to data data value.

34. The system of claim 29, wherein the current replication factor is 3 and the new replication factor is 4.

35. The system of claim 34, wherein quorum is 3.

36. The system of claim 29, wherein determining a first set of nodes on which to perform the subsequent read operation comprises selecting the first node and one or more nodes immediately following the first node in the ring structure such that a total number of nodes in the first set is equal to the replication factor.

37. The system of claim 29, wherein any subset of the second set of nodes may be selected to establish quorum.

38. The system of claim 37, wherein at least one node of the subset of the second set of nodes includes a most up to date data value.

39. The system of claim 38, wherein establishing quorum comprises updating a data value for a node of the subset not including the most up to date data value using the at least one node of the subset that includes the most up to date data value.

40. The system of claim 29, wherein a background process updates the data values for the new node while the new nodes is in the transition state.

41. The system of claim 40, wherein the new node transitions from the transition state to a normal operating state once the background process completes updating the data values for the new node.

42. The system of claim 41, wherein the new replication factor reverts back to the current replication factor once the new node transitions to the normal operating state.

* * * * *